United States Patent
Koss et al.

(10) Patent No.: US 7,033,629 B2
(45) Date of Patent: *Apr. 25, 2006

(54) NUTRITIONAL FROZEN DESSERT AND METHODS OF MANUFACTURE

(75) Inventors: Ronald Koss, Montpelier, VT (US); Arnold Koss, South Burlington, VT (US)

(73) Assignee: Nutricopia Inc., Montpelier, VT (US)

( * ) Notice: Subject to any disclaimer, the term of this patent is extended or adjusted under 35 U.S.C. 154(b) by 95 days.

This patent is subject to a terminal disclaimer.

(21) Appl. No.: 10/238,039

(22) Filed: Aug. 29, 2002

(65) Prior Publication Data

US 2003/0147995 A1    Aug. 7, 2003

Related U.S. Application Data

(60) Provisional application No. 60/316,563, filed on Aug. 31, 2001.

(51) Int. Cl.
*A23L 1/302* (2006.01)
*A23L 1/304* (2006.01)
*A23L 1/09* (2006.01)

(52) U.S. Cl. ............... 426/72; 426/74; 426/100; 426/101; 426/103; 426/658

(58) Field of Classification Search ........... 426/72, 426/74, 100, 101, 103, 658
See application file for complete search history.

(56) References Cited

U.S. PATENT DOCUMENTS

| | | | |
|---|---|---|---|
| 3,928,649 A | 12/1975 | Cobb | |
| 3,968,266 A | 7/1976 | Baugher | |
| 4,218,482 A | 8/1980 | Cook et al. | |
| 4,289,788 A | 9/1981 | Cajigas | |
| 4,309,446 A | 1/1982 | Garbrecht | |
| 4,346,120 A | 8/1982 | Morley et al. | |
| 4,376,791 A | 3/1983 | Holbrook | |
| 4,533,560 A | 8/1985 | Procunier | |
| 4,552,773 A | 11/1985 | Kahn et al. | |
| 4,626,441 A | 12/1986 | Wolkstein | |
| 4,737,368 A | 4/1988 | Batterman et al. | |
| 4,737,374 A | 4/1988 | Huber et al. | |
| 4,789,664 A | 12/1988 | Seligson et al. | |
| 4,826,656 A | 5/1989 | Huber et al. | |
| 4,855,156 A | 8/1989 | Singer et al. | |
| 4,900,566 A | 2/1990 | Howard | |
| 4,966,783 A | 10/1990 | Buckholz, Jr. et al. | |
| 4,971,810 A | 11/1990 | Hoyda et al. | |
| 5,084,295 A | 1/1992 | Whelan et al. | |
| 5,106,643 A | 4/1992 | Laufer | |
| 5,112,626 A | 5/1992 | Huang et al. | |
| 5,164,214 A | 11/1992 | Wild | |
| 5,175,013 A | 12/1992 | Huang et al. | |
| 5,290,605 A | 3/1994 | Shapira | |
| 5,393,551 A | 2/1995 | Arcadipane | |
| 5,449,523 A | 9/1995 | Hansen et al. | |
| 5,510,137 A | 4/1996 | Okada et al. | |
| 5,516,537 A | 5/1996 | Fuisz | |
| 5,527,554 A | 6/1996 | Olinger et al. | |
| 5,571,334 A | 11/1996 | Dunn et al. | |
| 5,686,123 A | 11/1997 | Lindahl et al. | |
| 5,707,670 A | 1/1998 | Mehansho et al. | |
| 5,753,295 A | 5/1998 | Goldman | |
| 5,902,797 A | 5/1999 | Bell et al. | |
| 5,942,264 A | 8/1999 | Monte | |
| 5,968,896 A | 10/1999 | Bell et al. | |
| 5,985,339 A | 11/1999 | Kamarei | |
| 6,010,734 A | 1/2000 | Whelan et al. | |
| 6,024,994 A | 2/2000 | Jacobson et al. | |
| 6,030,650 A | 2/2000 | Kamarei | |
| 6,039,986 A | 3/2000 | Mallangi et al. | |
| 6,063,411 A | 5/2000 | Jacobson et al. | |
| 6,093,425 A | 7/2000 | Kamarei | |
| 6,162,468 A | 12/2000 | Stanley et al. | |
| 6,187,365 B1 | 2/2001 | Vaghela et al. | |
| 6,399,134 B1 | 6/2002 | Best et al. | |
| 2002/0009530 A1 | 1/2002 | DuBois et al. | |

FOREIGN PATENT DOCUMENTS

| | | |
|---|---|---|
| AT | 385180 B | 2/1988 |
| DE | 140 328 | 2/1980 |
| EP | 0 271 963 A2 | 6/1988 |
| EP | 0 943 245 A1 | 9/1999 |
| EP | 0 970 623 A2 | 1/2000 |
| SU | 1551325 | 3/1990 |
| WO | WO97/30600 A1 | 8/1997 |
| WO | WO 97/34496 A2 | 9/1997 |
| WO | WO 98/44807 A1 | 10/1998 |
| WO | WO 00/53035 A1 | 9/2000 |
| WO | WO 00/59519 A2 | 10/2000 |
| WO | WO 00/69272 A1 | 11/2000 |
| WO | WO01/50879 A1 | 7/2001 |

OTHER PUBLICATIONS

Jana, A.H. et al, "Sweeteners for frozen success—a review," Australian Journal of Dairy Technology (Nov. 1994) No. 2.
Anonymous, "Crystalline fructose sweetens gourmet ice cream," Food Engineering, vol. 54, No. 6, pp. 29,31 (1982).
International Search Report PCT/US 02/16138; dated May 9, 2002.

*Primary Examiner*—Helen Pratt
(74) *Attorney, Agent, or Firm*—Steubing McGuinness & Manaras LLP

(57) ABSTRACT

The invention relates to methods for preparing nutritional frozen desserts having palatable characteristics. The invention also includes the nutritious frozen desserts.

60 Claims, No Drawings

NUTRITIONAL FROZEN DESSERT AND METHODS OF MANUFACTURE

This application claims priority to co-pending U.S. Provisional application Ser. No. 60/316,563 filed Aug. 31, 2001 and entitled NUTRITIONAL FROZEN DESSERT AND METHODS OF MANUFACTURE.

FIELD OF THE INVENTION

The invention relates to frozen dessert formulations and methods of producing the same. In particular the invention relates to frozen desserts such as ice cream having enhanced nutritional properties.

BACKGROUND OF THE INVENTION

Frozen dessert products such as ice cream have been enjoyed by consumers for years, but generally have not been considered to be nutritious products. Many attempts have been made to develop ice cream which retains its desirable taste but which has improved nutritious properties. For instance, several attempts have been made to produce ice cream having low levels of fat. Often, these modified ice creams sacrifice taste for improved nutritional properties, and as a result are not accepted by consumers.

Methods for manufacturing and formulating ice cream are well known. In general, the methods involve the mixing of ingredients, followed by processing and freezing. Briefly, milk of varying fat proportions and/or hydrated milk powder is combined with cane sugar or derivatives and/or corn syrups, modified food starches, maltodextrins, stabilizing gums and emulsifiers. Ice cream with high levels of fat also include the addition of cream to the mix. After the ingredients are mixed, the material is pasteurized, homogenized and chilled. This process material preferably is stored for a period of time ranging from a few hours to 24 hours. After the storage step a flavoring component is added to the mixture, if desired. If chocolate ice cream is being prepared, cocoa is added in the first mixing step and does not need to be added after the storage. Following the flavoring step the material is partially frozen, packaged and then completely frozen.

The percentage of solids incorporated into the mixture at the first step is generally carefully analyzed prior to pasteurization. It is important to confirm the amount of solids in the ice cream in order to determine the required pasteurization temperature and time as well as for quality assurance of the batching procedure. The percentage of solids at that stage of the method is an indication of the density of the product. The final density will depend on the amount of air incorporated when freezing. Solids exceeding 45% are typically considered unsuitable or problematic for commercial manufacturing. High percentages of solids and viscous mixtures increase the probability of "burn on" during pasteurization and/or clogging and disrupted production flow during cooling. As solids are cooked onto the pasteurization plates, off flavors may result causing spoilation of the entire mixture. Chocolate or dark mixes tend to be more forgiving because of the strong flavor characteristic of the chocolate. Generally, 45% solids is generally considered to be the standard manufacturing upper limit for ice cream mixes.

SUMMARY OF THE INVENTION

The invention relates in some aspects to an improved method for the preparation of nutritious ice cream. It has been discovered according to the invention that a fortified ice cream which is supplemented with macro- and/or micronutrients including, for instance, vitamins, minerals, oils, proteins, fibers, phytonutrients, prebiotics, probiotics, botanicals and nutraceuticals and which is palatable can be prepared. Even with the addition of all of these components, the ice cream maintains favorable organoleptic properties. The invention is based, at least in part, on the surprising finding that ice cream containing many of these nutrients can retain favorable organoleptic properties if prepared according to specific methods. The methods of the invention allow for the inclusion of solids not traditionally found in frozen desserts, while retaining standard operating procedures and manufacturing equipment established for commercial manufacturing. The methods utilize greater than 25% by weight of the total sugar added of a high Freezing Point Depression Sweetener and other components such as acidulants. A preferred sweetener is crystalline fructose.

Thus, in some aspects, the invention is a method for making a nutritious frozen dessert. The method involves mixing a base component, a nutrient core including at least one micronutrient selected from the group consisting of folate, magnesium, phosphorus, zinc, selenium, iron, copper, chromium, molybdenum, manganese, iodine, potassium, sodium, vitamin A, vitamin C, vitamin D, vitamin B1, vitamin B2, vitamin B3, vitamin B5, vitamin B6, vitamin B12, vitamin E, vitamin K, biotin and combinations thereof, and a sweetener including greater than 25% by weight of the total sugar added is a high Freezing Point Depression Sweetener in a mixing chamber to produce a prepasteurized mixture, pasteurizing the prepasteurized mixture, and freezing the pasteurized mixture to produce the nutritious frozen dessert. In some embodiments, the base component is dairy, soy, rice, oats, almonds, sesame, sunflower, lupine, taro or a combination thereof. In other embodiments the prepasteurization mixture includes from about 0.1% to about 80% of the daily value of calcium, magnesium, phosphorus, zinc, vitamin A, vitamin D, and from about 0.1% to about 100% of the daily value of folate, vitamin B1, vitamin B2, vitamin B3 and from about 0.1% to about 200% of the daily value of vitamin B6, Vitamin B12, vitamin E, and from about 0.1% to about 250% of the daily value of vitamin C. The percent daily value is based on a 2000 calorie diet.

In other embodiments the nutrient core added to the mixture includes per serving size: from about 5% to about 50% of the daily value of Folate, Calcium, Magnesium, Phosphorus, Zinc, Vitamin A, Vitamin D, and Vitamin B1; from about 5% to about 100% of the daily value of Vitamin C and Vitamin E.

In yet other embodiments the nutrient core added to the mixture includes per serving size: about 50% of the daily value of Folate: about 40% of the daily value of Calcium and Vitamin D; about 33% of the daily value of Magnesium, Zinc and Vitamin A; about 25% of the daily value of phosphorus and Vitamin B1; and about 100% pf the daily value of Vitamin C and Vitamin E.

The method involves the addition of a sweetener, including greater than 25% by weight of the total sugar added of a high Freezing Point Depression Sweetener to the pre-prepasteurized mixture. The sweetener may be a combination of a high dextrose equivalent sweetener, an artificial sweetener and a highly concentrated sweetener. For instance, the sweetener or combination of sweeteners may be crystalline fructose, aspartame, corn syrup, sucrose, sucralose, maltodextrin, and/or stevia. In preferred embodiments, the high Freezing Point Depression Sweetener is a crystalline fructose.

The method may additionally include the step of adding a flavoring agent. In one embodiment, the flavoring agent is chocolate and the cocoa is added to the prepasteurized mixture. In other embodiments, the flavoring agent is a non-fruit flavoring agent, such as, coffee, vanilla, mocha, mint, caramel, green tea, hazelnut, ginger, coconut, pistachio, or rose. In yet other embodiments, the flavoring agent is a fruit flavor such as mandarin, orange, strawberry, banana, raspberry, mango, passion fruit, etc. The flavoring agent may be added after the pasteurization step in a flavor tank.

In another embodiment, an acidulant is added to the prepasteurization mix.

In yet other embodiments, the prepasteurized mixture includes macronutrients such as proteins, dietary fiber and fatty acids.

In another embodiment the nutrient core added to the mixture includes per serving size: about 6 g of protein, about 50% of the daily value of B6 and Selenium, about 40% of the daily value of Calcium and Vitamin D; about 33% of the daily value of Magnesium, Zinc, Copper; about 25% of the daily value Vitamin B1, Vitamin B2, Vitamin B3; and about 100% of the daily value of Vitamin E.

In other aspects, the invention relates to a nutritious frozen dessert. The nutritious frozen dessert includes a base component, a nutrient core of at least 1% of the weight of the dessert product and a sweetener including greater than 25% by weight of the total sugar added of a high Freezing Point Depression Sweetener. The nutrient core includes at least one micronutrient selected from the group consisting of Folate, Magnesium, Phosphorus, Zinc, Selenium, iron, copper, chromium, molybdenum, manganese, iodine, potassium, sodium, Vitamin A, Vitamin C, Vitamin D, Vitamin B1, Vitamin B2, Vitamin B3, Vitamin B5, Vitamin B6, Vitamin B12, Vitamin E, Vitamin K, biotin, choline, chloride, vanadium, boron and combinations thereof. In a preferred embodiment, the High Freezing Point Depression Sweetener is crystalline Fructose. In one embodiment, the crystalline Fructose may be present in a range of about 3 weight percent to about 17 weight percent of the frozen dessert formula.

In other aspects of the invention, the frozen dessert comprises a base component selected from the group consisting of: dairy, soy, rice, oat, almond, sesame, sunflower, lupine, taro, and combinations thereof.

In another embodiment, the frozen dessert also includes an acidulant. The acidulant, may be present in a range of about 0.1 weight percent to about 1.1 weight percent.

In yet another embodiment, the nutritious frozen dessert includes per serving size, from about 0.1% to about 100% of Folate, Calcium, Magnesium, Phosphorus, Zinc, Vitamin A, Vitamin D, Vitamin B1, Vitamin B2, Vitamin B3, Calcium Pantothenate; and combinations thereof; from about 0.1% to about 200% of the daily value Vitamin B6, Vitamin B12, Vitamin E, and combinations thereof; from about 0.1% to about 250% of the daily value of Vitamin C; and a sweetener including greater than 25% by weight of the total sugar added of a high Freezing Point Depression Sweetener; wherein the percent daily value is based on a 2,000 calorie diet.

In another embodiment, the nutritious frozen dessert includes a base component, from about 0.1% to about 100% of the daily value of an ingredient selected from the group consisting of: Folate, Calcium, Magnesium, Phosphorus, Zinc, Vitamin A, Vitamin D, Vitamin B1, Vitamin B2, Vitamin B3, Calcium Pantothenate; from about 0.1% to about 200% of the daily value of Vitamin B6, B12, and combinations thereof; from about 0.1% to about 250% of the daily value of Vitamin C; at least about 100% of the daily value of Vitamin E; and a sweetener including greater than 25% by weight of the total sugar added of a high Freezing Point Depression Sweetener, wherein the percent daily value is based on a 2000 Caloric diet.

In yet another embodiment, the invention relates to a nutritious frozen dessert. The nutritious frozen dessert includes a base component that includes at least one high fat dairy product, a nutrient core of at least 1% by weight of the dessert product and a sweetener including greater than 25% by weight of the total sugar added of a high Freezing Point Depression Sweetener. The nutrient core includes at least one micronutrient selected from the group consisting of Folate, Phosphorus, Zinc, Selenium, iron, copper, chromium, molybdenum, manganese, iodine, Vitamin A, Vitamin C, Vitamin D, Vitamin B1, Vitamin B2, Vitamin B3, Vitamin B5, Vitamin B12, Vitamin K, Vitamin E, biotin; and combinations thereof.

In preferred embodiments, the sweetener includes greater than 45%, 50%, or 75% by weight of the total sugar added of a high Freezing Point Depression Sweetener.

In another preferred embodiment, the sweetener is 100% by weight of the total sugar added of a high Freezing Point Depression Sweetener.

Other aspects of the invention include fruit and non fruit flavorings. Non fruit flavorings may include coffee, chocolate, chocolate mint, vanilla, caramel, maple, mocha, green tea, hazel nut, ginger, coconut, pistachio, rose, rum raisin and combinations thereof. Fruit flavorings may include mandarin, orange, strawberry, banana, raspberry, mango, passion fruit, peach, and combinations thereof.

Each of the limitations of the invention can encompass various embodiments of the invention. It is, therefore, anticipated that each of the limitations of the invention involving any one element or combinations of elements can be included in each aspect of the invention.

DETAILED DESCRIPTION

Methods for preparing palatable fortified frozen desserts have been discovered according to the invention. The frozen desserts include a core of micronutrients that are known to cause unfavorable organoleptic properties such as bitter and metallic off flavors. In order to disguise or cover these off flavors extraordinary levels of sweetness are required. To supply this elevated degree of sweetness using information and methods known and established in the prior art, results in formulations with both excessive amounts of sugars as a percentage by weight and levels of solids that may compromise the finished product or even prohibit manufacturing using standard equipment. It has been discovered, according to the invention, that surprisingly specific types of sweeteners when used at levels that exceed those considered by the prior art to be the upper limit for such sweeteners, result in delivering the necessary extraordinary sweetness without: exceeding the space available for total solids (preferred maximum of 42%); exceeding the typically desirable level of sugar content of about 16 percent by weight; significantly depressing the freezing point; or compromising texture and overall quality and stability. The types of sweeteners and the amounts in which they are used in the methods of the invention have previously been considered to be unsatisfactory for the preparation of ice cream products. This is because low molecular weight sweeteners such as crystalline fructose have twice the impact on depressing the freezing point of an ice cream mix as does, for example, sucrose. As a result, the prior art considers that this effect on freezing point restricts to about 25% of the total sugar added, the amount of fructose that can be used in formulating an ice cream mix. A mix with a freezing point that is too depressed results in slower freezing and/or freezing problems that might decrease production capacity or even desired product quality. For example, the incorporation of air or the whippability of a mix is reduced as the freezing point is lowered. Air that is whipped into the mix may produce the desired texture that is typically associated with ice cream. As a result and accordingly, the prior art emphasizes that care must be taken to avoid unduly lowering the freezing point.

Surprisingly, it was discovered according to the invention, that sweeteners having high Relative Freezing Point Depressions and preferably high Relative Sweetness may be used in ice cream products at levels which exceed the prior art standards by a factor of three or approximately 75% by weight of the total sugar added. This level of use of high Freezing Point Depression Sweeteners would be unsuitable for the formulation and the manufacture of ice cream according to the prior art.

The invention is based, in part, on the discovery that this class of sweeteners, referred to herein as high Freezing Point Depression Sweeteners, if added in the appropriate concentration during the process of preparing a highly fortified frozen dessert such as an ice cream product, favorably alters the organoleptic properties of the frozen dessert while conforming to standard and expected manufacturing processes and procedures. The elevated relative level of sweetness contributed by such sweeteners effectively delivers sweetness and conserves space within the frozen dessert mix for the addition of supplemental nutrients. Thus, the invention encompasses a nutritionally fortified frozen dessert product having favorable organoleptic properties characteristic of comparatively low nutrient standard ice cream like desserts. A frozen dessert product as used herein is a product, which is solidified under freezing conditions to a hard pack or a soft, semi-fluid or spoonable consistency. The frozen dessert products include, for example ice cream, sherbet-like variations, or variations of ice cream having non-dairy base components such as rice or soy or combinations of non-dairy and dairy base components. The frozen dessert product may be fortified with vitamins, minerals, proteins, amino acids, essential an non-essential fatty acids, carbohydrates, dietary fibers, fiber derivatives, ribose, plant sterols, prebiotics, botanicals, phytonutrients, flavonoids, and other food constituents and/or engineered analogs. The invention allows for the significant reduction of off flavor impact; off colors and textures created by the macro and micro-nutrients used to fortify the ice cream. Because ice cream remains principally a pleasure food, these types of ingredients are not traditionally found in frozen desserts because of their unpalatable characteristics and well known resistance to masking. Also, the serving size for ice cream has been established by the FDA as "½ cup" or 4 fl oz (118 ml). This contrasts with the typical serving size of 8 fl oz (237 ml) for liquid nutritional products used as meal supplements and/or replacements. The smaller serving size for ice cream makes it very difficult to provide ice cream with comparable, near comparable, or superior nutritional value to the more voluminous liquid nutritional. The use of ice cream as an effective nutrient delivery system has been hampered by the small volume serving size and the necessity to provide ice cream satisfaction. The small volume serving size results in concentrating the off flavors characteristic of the micronutrients as well as difficulty in adding potentially additional solids found in proteins, fats, carbohydrates and/or other supplemental ingredients. This concentration of solids, in addition to concentrating the off flavors, increases the likelihood that the percentage of solids in the fortified ice cream mix will exceed the level of solids tolerated in commercial ice cream production. The two formulating challenges in developing a fortified ice and/or frozen ice cream like dessert are "taste" and "space". These problems have been effectively overcome by the methods and discoveries of the invention.

It has been discovered, according to the invention, that high Freezing Point Depression Sweeteners, and optionally acidulants when used in the manner described herein, can lead to the development of a fortified frozen dessert which includes nutrients at levels largely comparable and/or even exceeding the values found in established liquid meal supplements, such as market leader Ensure®. This was surprising because of the disparity in serving sizes between ice cream and liquid nutritionals. The frozen dessert product of the invention provides significantly more nutritional value ounce for ounce (by volume) than most liquid meal supplements. Additionally, certain embodiments of the frozen dessert invention include largely comparable or superior nutritional value to that of standard liquid meal supplements per serving, or in effect one-half the volume. This is surprisingly achieved while maintaining the desirable and demanding organoleptic properties expected of ice cream. For example, the following table provides a comparison of an example of a fortified ice cream product according to the methods of the invention with commercially available Ensure®.

TABLE 1

|  | Ice Cream of the Invention | Ensure ® |
| --- | --- | --- |
| Serving Size | 4 Fluid Ounces | 8 Fluid Ounces |
| Calories | 200 | 250 |
| Protein (g) | 6–9 | 9 |
| Fat (g) | 8 | 6 |
| Carbohydrate (g) | 24 | 40 |
| Fiber (g) | 2 | >1 |
|  | % DV | % DV |
| Vitamin A | 33 | 25 |
| Vitamin C | 100 | 50 |
| Vitamin D | 40 | 25 |
| Vitamin E | 100 | 25 |
| Vitamin B1 | 25 | 25 |
| Folate | 50 | 25 |
| Calcium | 40 | 30 |
| Magnesium | 33 | 25 |
| Phosphorous | 25 | 30 |
| Zinc | 33 | 25 |

Table 1 demonstrates that the ice cream formulation of the invention is a potent nutrient delivery system that is as nutrient dense as a standard liquid nutritional composition, but which only requires half the volume. Percent Daily Values are based on a 2,000-calorie diet. It has also been demonstrated that this material has favorable organoleptic characteristics (see Market Test).

The method of the invention is based at least partially on the discovery of a method for formulating the frozen dessert product in a manner that allows for additional ingredients without exceeding the percentage of solids established for commercial ice cream manufacturing. The addition of vitamins and minerals to a commercial dairy mix, while enhancing nutritional value also add a wide range of unappetizing flavors, including, but not limited to, bitter, metallic, and sour. The degree of adverse impact depends upon the level of fortification with these ingredients. Attempts to increase the sweetness of ice cream with additional industry standard sweeteners to offset these unappetizing flavors is not effective or necessarily viable. It was discovered according to the invention that simply adding sweeteners to overcome off flavors tends to result in over-sweetening and fails to overcome the unappetizing and unacceptable flavors. Those skilled in the art of conventional ice cream adjust relative sweetness up or down according to a given flavor profile. Chocolate flavors, for example, typically require more sweeteners than vanilla because of the added cocoa. However, this approach is inadequate for fortified ice creams. A fortified ice cream does require significantly more relative sweetness than a conventional ice cream, however, surprisingly, it was discovered that a non-flavor related acidulant added at the appropriate time during manufacture significantly reduces the amount of additional sweetener used and helps to mask characteristic off flavors contributed by supplemental ingredients. Also, in a preferred embodiment, in concert with the acidulant it was discovered that the utilization of a high dextrose equivalent (DE) sweetener such as crystalline fructose provides additional space or room for solids for example, additional sweeteners, micronutrients, supplemental nutrients and macronutrients. In this regard where space is needed the acidulant supports both the masking of undesirable flavors and the reduction of incremental sweetness required.

In general, the method is accomplished by mixing a base component with the nutrients, sweeteners, the acidulant, and optionally emulsifiers, and stabilizers in a mixing tank. Once this mixture is complete, the material is pasteurized, homogenized, chilled and optionally stored with gentle agitation under refrigeration for several hours to a day in a holding tank(s). The entire mixture or a portion of it may then be moved into a flavor vat or tank where optionally a flavor is mixed in. The flavored mixture is checked for taste and color properties and then partially frozen and put into containers or made into novelties. The base component is an important part of the frozen dessert product, as it forms a large percentage of the formulation by weight.

The base component may be dairy, non-dairy and combinations thereof. A non-dairy component is useful, for instance, for individuals who are lactose intolerant or have allergies to dairy. Dairy based components include, but are not limited to, cream, whole milk, concentrated whole milk, evaporated whole milk, sweetened condensed whole milk, superheated condensed whole milk, dried whole milk, skim milk, concentrated skim milk, evaporated skim milk, condensed skim milk, superheated condensed skim milk, sweetened condensed skim milk, sweetened condensed part skim milk, non-fat dry milk, sweet cream buttermilk, condensed sweet cream buttermilk, dried sweet cream buttermilk, concentrated skim milk from which a portion of the lactose has been removed, casein, modified casein, modified whey, whey protein concentrate, caseinate, and dehydrated milk, whey protein isolates, hydrolyzed milk protein, denatured milk proteins. Non-dairy based components include, but are not limited to legume, seed and nut derived protein sources such as soy milk, concentrated liquid soymilk, soy milk powder, soy concentrate, soy isolate, rice milk, rice protein concentrate, oats, almonds, sesame, sunflower, cashews, taro and lupine. The base component of a frozen dessert product may be composed of a single dairy or non-dairy base component or a combination of two or more of these components.

An acidulant as used herein is an acidifying agent that is safe for consumption. Acidulants include, but are not limited to, citric acid, malic acid, adipic acid, phosphoric acid, tartaric acid, ascorbic acid, lactic acid and lemon juice concentrate. A preferred acidulant is citric acid.

The optimal time for adding the acidulant to the mixture is prior to the pasteurization process. The acidulant may be mixed with the micronutrients prior to their addition to the base component or may be administered directly to the base component and other components of the mixture. Preferably, the acidulant is premixed with a portion of the sweetener in a dry form and subsequently added to the base mix. Optimal results were achieved when the acidulant was added in this manner. Although applicant is not bound by any mechanism, it is believed that the premixture of the acidulant with the sweetener reduces the potential of the acidulant to cause curdling when it comes into contact with the base component, if the base component is a dairy product, and that dispersion is optimized by this premixture. The acidulant may also be dispersed with other components (dry or liquid) such as vitamins and minerals.

It was discovered that the acidulant could be added after the pasteurization process or at the flavor vat in some ice cream formulations, but that the favorable organoleptic properties were reduced somewhat by this delayed addition of the acidulant. Thus, it was discovered, quite unexpectedly, that the timing and method for introduction of the acidulant to the mixture had dramatic impact on the organoleptic properties of the resultant frozen dessert product.

Although some methods for manufacturing tart ice cream flavors and other frozen dessert products have utilized acids such as citric acid, the acid is not added at the appropriate time or in the appropriate concentration, as preferred, to mask the unpalatable flavor of the nutrient mixture according to the invention. It is known, that when formulating a fruit flavor, ice cream makers purchase fruit puree's and concentrates that can be added at the flavor tank without requiring additional ingredients to enhance the natural tartness of the flavor. For instance, citric acid is sometimes mixed with fruit flavorings, such as raspberry, which are added to the ice cream mixture after pasteurization in the flavor tank. The acid is added to provide the acidic tart flavor of fruit. It is known to add citric acid at the flavor vats for sherbets and water ices at levels between approximately 100 mg–300 mg per serving. Sherbet and water ice formulators add an acidulant at the flavor vat (in addition to fruit juices, flavors and colors) to, in effect, satisfy the need to include more solids, as sugars, to obtain a satisfactory texture.

In contrast, based on a micronutrient core representing approximately 2.5% by weight of the formulation, approximately 0.27% by weight of citric acid to as much as approximately 0.8% and up to as much as 0.9% citric acid may be added in some preferred embodiments of the present invention for neutralizing unpalatable flavors, maintaining a pH range for the mix of about 6.3–about 7.1, and for flavoring. As the micronutrient levels increase, the level of acidulant may also need to be increased. In a preferred embodiment, the acidulant is added after the sugars, gums, emulsifiers, oils and other ingredients, and in close proximity to the vitamin and mineral mixture. In a more preferred embodiment, the acidulant is mixed with a portion of the sugars, or alternatively mixed with the micronutrients to reduce the probability of curdling for dairy based mixes and maximize the organoleptic properties. According to a preferred embodiment, anhydrous citric acid is added during mix making prior to pasteurization at levels that may range from 0.1 wt % to about 0.6 wt %. In one embodiment having a micronutrient core of approximately 2.5% by weight, the prepasteurization acidulant level is approximately 0.2% to approximately 0.4%. In a preferred embodiment, the citric acid may be as low as about 0.27 wt % to about 0.4 wt % of the frozen dessert product. It is contemplated that those of skill in the art can identify levels of other acidulants for use in the prepasteurization mix making stage based on the guidelines provided herein. When a tart fruit flavor is desired, an acidulant may also be added at the flavor vat in addition to the unflavored mix. In one embodiment such as a raspberry dairy ice cream, 0.38% of an acidulant is added at the prepasteurization stage, and about 0.39% acidulant is added at the flavor vat. For example, the total citric acid added to an orange flavor ice cream of the present invention is about 360 mg per ½ cup serving; and for a raspberry flavor ice cream of the present invention is about 750 mg per ½ cup serving. The amount of acidulant may vary depending on the make-up of the supplemental ingredients and the amount added as a percentage by weight. In another embodiment the acidulant is added at the prepasteurization stage at approximately 0.1% to approximately 0.19%. In another embodiment, the acidulants used may be approximately 0.5% to approximately 1.1% at the prepasteurization stage. These high levels threatened to curdle the dairy products, thus ruining the mixture. When the acidulant is added in close proximity to the vitamin and mineral mixture or with the vitamin and mineral mixture, the incidence of curdling is reduced and the organoleptic products are maximized. It is found that the organoleptic impact may be enhanced by adding the acidulant to the ice cream mix, white or chocolate, prior to pasteurization. Additional acidulant may also be added at the flavor vat to increase the natural tartness of a fruit flavor. Surprisingly, it has been found that adding all the acidulant to the flavor vat instead of adding a portion of an acidulant to the prepasteurization mix, results in suboptimal organoleptic properties.

Without the acidulant, and depending upon the level of fortification, fortified ice creams have significant unpalatable flavor that cannot be sweetened over or flavored over. As demonstrated in Table 2, a super premium ice cream includes a high percentage of solids (40%) as a result of the fat content. The addition of a micronutrient core at 2.5% by weight presents a major problem in super premium ice cream. Without the addition of the acidulant during mix making, the additional micronutrients would require increasing the sucrose added, for example, from 14% to perhaps 25% or more. An increase of 11% solids creates a formulation with solids greater than 53%, which far exceeds 45% solids, the upper limit generally recognized for commercial manufacturing, leaving no room for added proteins, fiber or other supplemental nutrients. Although the sugar may provide some relief from the unpalatable flavor, some of the off flavors may still be apparent, the ice cream may be excessively sweet, and the manufacturing process may be compromised. Additionally, the increase in sweeteners as well as the micronutrient core would far exceed the accepted range of percentage of solids (45%) generally accepted for manufacturing ice cream. The super premium template as conventionally considered is a non-starter for a commercially viable fortified ice cream formula that does not minimally require equipment modifications and/or resolve the excess levels of solids and sugars that would likely result in unacceptably soggy and sticky ice cream. However, according to the present invention, the preferred use of the acidulant in concert with the use of extraordinary levels of a high freezing point depression and high DE sweetener such as crystalline fructose may allow the super premium ice cream to be fortified. For example, by adding the acidulant (as citric acid) at 0.28% and using a sweetener blend of approximately 11% fructose, 3% sucrose and 2% rice syrup, it is possible to reduce the total solids to 44.98%, still leaving no room for additional nutrients but expanding the potential for ice cream and ice cream like frozen desserts to deliver unique and beneficial meal supplemental support.

TABLE 2

|  | Super Premium 15% Butterfat | Premium 10% Butterfat | Low Fat 3% Fat | Formulated Frozen Dessert of the Invention |
| --- | --- | --- | --- | --- |
| Serum Solids | 10 | 10 | 10 | 8.5 |
| Fat from Milk | 15 | 10 | 3 | 3.45 |
| Fat from Other Oils | 0 | 0 | 0 | 3.3 |
| Emulsifier | 1 | 0.25 | 0.5 | 0.25 |
| Sucrose | 14 | 15 | 12 | 3.25 |
| Fructose | 0 | 0 | 0 | 11.25 |
| Maltodextrin | 0 | 0 | 6 | 2 |
| Stabilizer | 0.2 | 0.2 | 0.3 | 0.2 |
| Micronutrient Pre-mix | 0 | 0 | 0 | 2 |
| Added Protein | 0 | 0 | 0 | 4 |
| Citric Acid | 0 | 0 | 0 | 0.1–0.6 |
| Fiber | 0 | 0 | 0 | 1 |
| Other Solids | 0 | 0 | 0 | 1 |
| Total Solids (%) | 40.2 | 35.45 | 34.8 | 40.5 |

In the premium and low fat ice cream examples presented in Table 2 above, there is more room (34%–35% solids) for fortification than with super premium ice cream. The addition of a micronutrient core, however, would still necessitate a significant increase in relative sweetness which would result again in exceeding the available space for solids in the ice cream. Additionally, the formulated ice cream would not have enough room for solids such as proteins, fibers, or other beneficial ingredients useful for further supplementing and fortifying the ice cream. Moreover, the off flavors would linger behind the sweetness and flavor profile. Increasing the sucrose to 25% to again attempt to accommodate the off flavors would immediately increase the solids to 45+% and create a problematic formula with excessive sugars. Even in doing so, without adding other supplemental ingredients, would result in a fortified ice cream that does not taste or feel like typical ice cream. If a micronutrient core of 1% by weight of the formula could be added to ice cream, it is likely that less sweetness would be needed than with the addition of 2% micronutrient core. However, the resultant ice cream product may still be excessively sweet and would certainly not have as much nutrient fortification as can be achieved according to the invention. In contrast and with great advantage, the unique utilization of a high Freezing Point Depression Sweetener and optionally an acidulant and/or the use of other sweeteners such as corn syrup, rice syrup, sucrose, dextrose, aspartame, sucralose or others expands the space available for supplementation and improves the organoleptic characteristics. Making the adjustments in sweeteners and adding the acidulant pushes the total solids down to 39.23%, allowing room for other ingredients. The choice of sweetener(s) may expand the space or room in an ice cream mix allowing for a higher concentration of nutrient core. The sweetener choice may also be influenced by the amount of relative sweetness needed for satisfactory organoleptic results. Freezing point depression is also concurrently a determinant of sweetener choice and level of use. Economics is also an established factor influencing sweetener choice as are particular flavors imparted by sweeteners such as corn syrup products, honey, brown sugars and maple syrup. The sweeteners useful according to the invention are high Freezing Point Depression Sweeteners. A "high Freezing Point Depression Sweetener" as used herein refers to a sweetener which has a relative Freezing Point Depression of at least 1.5. Preferably, the high Freezing Point Depression Sweetener has a relative sweetness approximate to or greater than that of sucrose. Optionally, the sweetener may be a low molecular weight sweetener. The relative Freezing Point Depression factor estimates freezing point depression relative to solids equal in weight to sucrose. High Freezing Point Depression Sweeteners include, but are not limited to, dextrose, crystalline fructose, high fructose corn syrup 90%, high fructose corn syrup 55%, and high fructose corn syrup 42%. Other complementary sweeteners that may also be used in the sweetener blend include but are not limited to fructose, sucrose, lactose, maltose, dextrose, honey, invert sugar, corn syrup, rice syrup, grain syrup, maltodextrin, polydextrose, oligodextrin, cane based sweeteners, beet based sweeteners etc. Artificial sweeteners, sugar substitutes and non-nutritive sweeteners may also be used and include, but are not limited to, edible saccharin salts, aspartame, saccharine, alitame, acesulfame K, tagatose, L-sugars, neophesperidin, thaumatin, dihydrochalchones, cyclamates, steviosides, glycyrrhizins, synthetic alkoxy aromatics, such as dulcin, sucralose, suosan, miraculin, monellin, sorbitol, xylitol, talin, cyclohexylsulfamates, synthetic sulfamic acids, oximes, aspartyl malonates, succanilic acids, amino acid based sweeteners, and carboxylates such as 3-hydroxy-4-alkyloxyphenyl aliphatic carboxylates. A list of sweeteners and their corresponding Relative Freezing Point Depression and Relative Sweetness is presented in Table 3. Other sweeteners which are high Freezing Point Depression Sweeteners according to the invention will be identifiable by those with skill in the art. In a preferred embodiment, the high Freezing Point Depression Sweetener has a relative sweetness level of at least about 100.

TABLE 3

| INGREDIENT | AVERAGE MOLECULAR WEIGHT[1] | RELATIVE SWEETNESS[2] | TOTAL SOLIDS (%) | RELATIVE F.P. DEPRESSION[3] | MAXIMUM TOTAL SUGAR SUPPLIED[4] |
|---|---|---|---|---|---|
| Dextrose | 180 | 74 | 92 | 1.90 | 40 |
| Fructose | 180 | 173 | 100 | 1.90 | 40 |
| Sucrose | 342 | 100 | 100 | 1.00 | 100 |
| Lactose | 342 | 16 | 100 | 1.00 | g |
| Maltose | 342 | 32 | 100 | 1.00 | |
| Honey | | 75 | 74 | 1.46 | 45 |
| Invert sugar | 261 | 95 | 77 | 1.12 | 30 |
| HFCS[5] | | | | | |
| 90% | 180 | 125 | 77 | 1.88 | 50 |
| 55% | 185 | 98 | 77 | 1.85 | 50 |
| 42% | 190 | 86 | 71 | 1.80 | 50 |
| HMCS[6]/55DE | 411 | 55 | 81 | 0.83 | 40 |
| Corn Syrups | | | | | |
| 68DE | 265 | 72 | 81 | 1.28 | 25–50 |
| 62DE | 298 | 68 | 82 | 1.15 | 25–50 |
| 52DE | 345 | 58 | 81 | 0.99 | 25–50 |
| 42DE | 428 | 48 | 80–81 | .80 | 25–50 |
| 36DE | 472 | 42 | 80 | 0.72 | 25–50 |
| 32DE | 565 | 40 | 80 | 0.61 | 25–50 |
| 25DE | 720 | 28 | 80 | 0.48 | h |
| 20DE | 900 | 23 | 80 | 0.38 | h |

TABLE 3-continued

| INGREDIENT | AVERAGE MOLECULAR WEIGHT[1] | RELATIVE SWEETNESS[2] | TOTAL SOLIDS (%) | RELATIVE F.P. DEPRESSION[3] | MAXIMUM TOTAL SUGAR SUPPLIED[4] |
|---|---|---|---|---|---|
| Maltodextrins | | | | | |
| 18DE | 1,000 | 21 | 95 | 0.34 | [h] |
| 15DE | 1,200 | 17 | 95 | 0.29 | [h] |
| 10DE | 1,800 | 11 | 95 | 0.19 | [h] |
| 5DE | 3,600 | 6 | 95 | 0.10 | [h] |

[1] Average molecular weights of CSS and maltodextrins are estimated by dividing the average molecular weight of starch, 18,000, by the dextrose equivalent (DE) factor.
[2] Sweetness relative to sucrose (approximate) on an as is or product basis.
[3] Factor to estimate freezing point depression relative to solids equal in weight to sucrose.
[4] Percent of sugar on a sweetness basis generally acceptable from a quality viewpoint.
[g] Lactose provides low sweetness but amount is limited by tendency to crystallize.
[5] HFCS—High-fructose corn syrup.
[6] HMCS—High-maltose corn syrup. 65% maltose.
[h] Lower DE cornstarch products build body and provide bulk rather than sweetness.

A preferred sweetener is crystalline fructose. Crystalline fructose is about 1.73 times sweeter than sucrose and has a low glycemic index. Crystalline fructose is not normally used in commercial ice cream preparation because it is known to depress the freezing point and also because it is more expensive. These drawbacks, however, are more than overcome by the advantages of fructose in the formulations of the invention. It is preferred that a commercial source of fructose has at least 90%, more preferably at least 95% and most preferably at least 99% fructose. In one embodiment, the crystalline fructose is present in a range from about 3.0 weight percent to about 17.0 weight percent. In another embodiment, the crystalline fructose is present in a range from about 3.0 weight percent to about 14.0 weight percent.

The use of high Freezing Point Depression Sweeteners allows for the significant increase in relative sweetness without increasing the actual percent of solids as sugar, such as sucrose, beyond the range typical of ice cream formulations (13%–17% by weight). Relative sweetness is defined as the sweetening effect of an added sugar as expressed as the weight of sucrose necessary to give an equivalent sweet taste to that of the added sugar. For example, when using 100 grams of a sweetener having a relative sweetness of 173, compared to sucrose, in order to obtain the same relative level of sweetness, 173 grams of sucrose must be used. The total amount of relative sweetness in the various embodiments of the invention exceeds the generally recognized upper limit of 20% in ice cream. Contrastly, the total amount of sweetness expressed as sucrose in standard ice cream is typically and most desirably 14%–16%. In some embodiments the total amount of high Freezing Point Depression Sweetener used in the product of the invention is that amount that would produce a relative sweetness of greater than 20% if an equivalent amount of sucrose was used. In some embodiments the relative sweetness is between 20.1% and 30%. In other embodiments, the relative sweetness is between about 20% to about 23%. In other embodiments, the relative sweetness is from about 23% to about 27%. In yet other embodiments the relative sweetness is from about 27% to about 30%.

Fructose in its pure crystalline form has a perceived sweetness of about 160 to 180, typically reported as 173, compared to sucrose at a value of 100. In the present invention, the level of fructose may be as high as 17% by weight or as low as 0% by weight if other sweeteners are used, as long as it includes another high Freezing Point Depression Sweetener. In one embodiment the level of fructose is about 10% to about 12% by formulation weight when used in conjunction with sucrose at about 3% to about 4% by weight and rice syrup at about 1.5% to about 3% by weight, wherein the high Freezing Point Depression Sweetener represents approximately 75% of the total sugars added. In another embodiment the level of fructose is about 3% to about 4% by weight when used in conjunction with sucrose at about 3% to about 4% by weight, stevia at about 0.03% to about 0.04% by weight and 18DE maltodextrins at about 5% to about 10% by weight, wherein the high Freezing Point Depression Sweetener represents approximately 50% of the total sugars added. The use of fructose provides relative sweetness and significantly reduces the percent of solids in the ice cream formulation with respect to a sugar such as sucrose. This allows for the conservation of space for additional fortification ingredients.

In conventional ice cream, the total amount of sweetness expressed as sucrose typically various from about 12% to about 20% and may range from about 13% to about 16%. In one embodiment of the present invention, when the micronutrient core is approximately 2.5% by weight of the formulation, the relative level of sweetness is about 23% to about 27%. In another embodiment the use of an acidulant such as citric acid in making the prepasteurization mix allows for the reduction of sweetness by about 15% to about 25%. In yet another embodiment, when the micronutrient core is about 1.6% by weight of the formulation, the relative sweetness is slightly greater than about 20%. As shown in Table 2 above, the use of the combination of an acidulant and fructose in the formulated frozen dessert helps maximize the availability of space for solids in the ice cream such that proteins, fibers, prebiotics and other nutrients can be added. The total solids, even with the addition of all these micro and macronutrients, is only 40.5% total. Thus, additional nutrients could be added if desired.

The products of the invention may include sweeteners which are not high Freezing Point Depression Sweeteners, as long as the total amount of sugar added in the product includes greater than 25% by weight of a high Freezing Point Depression Sweetener. In some embodiments the product includes greater than 30%, 35%, 40%, 45%, 50%, 55%, 60%, 65%, 70%, 75%, 80%, 85%, 90%, 95% by weight of the total sugar added of a high Freezing Point Depression Sweetener. In some preferred embodiments the sweetener includes greater than 45% by weight of the total sugar added of a high Freezing Point Depression Sweetener. In other preferred embodiments, the method utilizes greater than 75% by weight of the total sugar added of a high Freezing Point Depression Sweetener. In other embodiments the sweetener is 100% by weight of the total sugar added of a high Freezing Point Depression Sweetener. The high Freezing Point Depression Sweetener may be a single type of high Freezing Point Depression Sweetener or it may be a combination of more than one type of high Freezing Point Depression Sweetener.

A nutrient as used herein refers to micronutrients, macronutrients, concentrated food constituents, conditionally essential amino acids, digestive enzymes, phytonutrients, botanicals, prebiotics, probiotics, flavonoids, isoflavones, plant sterols, polyphenols, accessory nutrients such as n-acetylcysteine, alpha lipoic acid, co-enzyme Q, carotenoids, ribose, creatine, betaine, alpha ketoglutarate, beta glucans, choline, serine, nucleotides, ATP. Micronutrients include, but are not limited to, vitamins and minerals, such as, those recognized by the Food and Drug Administration in the Code of Federal Regulations 21 C.F.R 101.9. Non limiting examples of micronutrients include folate, calcium, magnesium, phosphorus, zinc, vitamin A, vitamin C, vitamin D, vitamin B1, vitamin B2, vitamin B3, calcium phosphate or acetate, magnesium phosphate or aspartate, magnesium citrate or glycinate, magnesium orotate or succinate, magnesium arginate tribasic; dipotassium phosphate dibasic; magnesium sulfate or oxide; salt (sodium chloride); potassium chloride or acetate; ascorbic acid; ferric orthophosphate; alpha-tocopheryl acetate; niacinamide; zinc oxide; calcium pantothenate; copper gluconate; riboflavin; beta-carotene; pyridoxine hydrochloride; thiamin mononitrate; biotin; chromium chloride or picolinate; potassium iodide or citrate; sodium selenite; sodium molybdate; phylloquinone; vitamin D3; cyanocobalamin; copper sulfate; vitamin B6 and hydrochloride thereof; vitamin E; vitamin E acetate; vitamin B12; manganese; potassium; sodium; copper; iron; selenium; iodine; chromium; molybdenum; boron; vanadium; vitamin B5; vitamin K; inositol; calcium citrate; zinc gluconate; zinc sulfate; cupric sulfate; manganese sulfate or arginate; ferrous sulfate; selenomethionine; chromium polynicotinate; boron amino acid chelate; vanadyl sulfate; retinyl palmitate; sodium ascorbate; ascorbate; cholecalciferol; d-alpha tocopherol; d-alpha tocopheryl succinate; thiamin hydrochloride; pyridoxine hydrochloride; choline; chloride.

Some vitamins are fat soluble and others are non-fat soluble. The fat-soluble vitamins include vitamin A, vitamin D, vitamin E, and vitamin K., i.e. K1 (phylloquinone), K2 (menaquinone), and K3 (menadione). Vitamins that are nonsoluble in fat include the vitamin B complex vitamins, and vitamin C.

The micronutrient core may be present at levels of at least about 1 percent by weight, preferably at least 1.6% weight percent, more preferably at least 2 weight percent and most preferably at least about 2.4 weight percent. In other embodiments, the micronutrient core may be present at levels of at least 2.6 weight percent and may be as high as about 4 weight percent.

The amount of micronutrients employed herein to fortify the frozen dessert products can vary. It is possible to fortify the frozen dessert products with a recommended daily allowance (RDA), or any portion or multiple of an RDA or percent daily intake, of any of the micronutrients or combinations thereof. It is also possible to fortify the frozen dessert products with other micronutrients, such as, micronutrients not currently identified in the U.S. Code of Federal Regulations as having a recommended daily allowance. In some embodiments it is preferred that the products be supplemented with micronutrients at about 2.5% by weight of the total formula on a per serving basis of ½ cup, which translates to approximately 2.3 g of the supplemental micronutrient mix.

A macronutrient is typically considered to be a protein, fat, or carbohydrate. Daily protein intake is calculated in terms of total protein, but the body uses protein in the form of individual amino acids, the building blocks from which complete proteins are made. None of the body's many different proteins, which make up enzymes, muscles, blood, organs and hormones for example, can be synthesized unless all the essential amino acids that make up a complete protein are available through the diet. Because proteins are continuously broken down in the body and because the body cannot synthesize them, the essential amino acids must be constantly replenished.

Surgery, trauma, compromised immune function, malabsorption and aging are associated with reduced nutrient stores and result in a catabolic state. Nutritional supplementation replaces or helps to maintain the body's normal level of nutrients by providing adequate proteins and other nutrients essential for tissue integrity, energy needs, wound healing, immune function, digestion and other physiological functions. The frozen dessert of the present invention may be provided to individuals who are under stress due to illness, accidents, age related eating decline or diminished appetite who may not otherwise receive the recommended daily allowance of these nutrients. Other applications, for example, pertain to use as a healthy snack, dessert, energy product or meal supplement.

For the nutrients referenced directly above, this chart compares the approximate nutrient values per ½ cup serving for a standard ice cream and an embodiment of the invention.

| | Standard Ice Cream[10] | Embodiment of the Invention |
| --- | --- | --- |
| Protein | 2 g | 6–9 g |
| Vitamin D | None reported | 40% DV (160 IU) |
| Vitamin K | None reported | 25% DV (20 mcg) |
| Vitamin E | <1% DV | 100% DV (30 IU) |
| Vitamin B1 | 3% DV (0.04 mg) | 25% DV (0.375 mg) |
| Vitamin B2 | 10% DV (0.18 mg) | 25% DV (0.425 mg) |
| Vitamin B3 | <1% DV | 25% DV (5 mg) |
| Vitamin B6 | None Reported | 50% DV (1 mg) |
| Vitamin B12 | None Reported | 50% DV (3 mcg) |
| Calcium | 10% DV (100 mg) | 40% DV (400 mg) |
| Magnesium | 2% DV (7.5 mg) | 33% DV (132 mg) |
| Zinc | None Reported | 33% DV (5 mg) |
| Copper | <2% DV | 33% DV (0.66 mg) |
| Selenium | None Reported | 50% DV (35 mcg) |

Lipids provide energy and essential fatty acids, and enhance absorption of the fat soluble vitamins such as vitamin A, vitamin D, vitamin E, and vitamin K. A frozen dessert is able to provide a wide variety of essential and nonessential fatty acids because the low temperatures help to minimize heat induced oxidative rancidity. Some polyunsaturated fats are as essential to proper nutrition as vitamins and minerals, because the body cannot synthesize them. These essential fatty acids (EFA) exhibit a myriad of physiological functions. For instance, EFAs produce hormone-like compounds, maintain cell membrane function, regulate pain, inflammation and swelling, dilate and restrict blood vessels, mediate immune responses, regulate smooth muscle responses, prevent blood clots, regulate blood pressure and nerve transmission, regulate cholesterol levels, and moderate depression. Other fats such as medium chain triglycerides are absorbed by the intestinal tract without emulsification by bile acids and are more rapidly taken up and metabolized by tissues than long chain fatty acids. Conjugated linoleic acid (CLA) is mainly found in milk fat, especially from grass fed cows and sunflower oil. CLA has been demonstrated to be a potent anticarcinogen and more recently has been demonstrated to inhibit the body's mechanism for storing fat, causing the body to utilize fatty reserves for energy. Other fats such as plant fats known as sterols and sterolins exhibit potent anti-inflammatory and immune modulating properties. These fats may be derived from a variety of plant sources such as seeds, nuts, herbs, spices, and fruits.

Fat free and low fat dairy products lack many essential fatty acids, which are important nutrients. The frozen dessert of the invention may be supplemented with fatty acids such as CLA, gamma linolenic acid (GLA) acids, specialized high oleic oils such as canola, and sunflower, long chain fatty acids such as docosahexaenoic acid (DHA) and eicosapentaenoic (EPA) to produce a substance with enhanced nutritional properties. Oils such as rice bran oil contain fractions called unsaponifiables, which supply gamma oryzanols and tocotrienols with vitamin E activity and other biological roles such as reduction of cholesterol synthesis and antioxidant potency. Flax and evening primrose are examples of other supplemental oils that may be used to expand the functional and medical food value of the invention. Other fat nutrients which can be added to the ice cream are phytosterols such as beta-sitosterol, stigmasterol, and campesterol. Phytosterols are found in many grains and seeds and include, but are not limited to, steryols, stanols, and there esterified derivatives. These compounds have been useful for lowering serum cholesterol and inhibiting prostate and colon cancers.

The frozen dessert of the invention may include approximately 0–20 grams of fat per four fluid ounce serving. Thus, the ice cream can be fortified with approximately 0-20% fat. The fat may be obtained from sources such as dairy (cows, goats, sheep etc.); seeds such as sunflower, canola, pumpkin, safflower, soy, rice, borage; nuts such as walnuts, almonds, macadamia, coconut, apricot kernel; legumes such as peanut, soy; other plants such as olive, rosemary, oregano; fish oils; sea algae oils, etc. A preferred range of fat in the ice cream product is about 3%–16%.

Proteins useful according to the invention are any suitable protein typically used in nutritional formulations. Protein sources include, but are not limited to, whey protein isolate, whey protein concentrate, whey powder, egg, soy milk powder, soy concentrate, soy protein isolate, rice protein, caseinate derivatives (e.g., sodium caseinate, calcium caseinate, potassium caseinate), animal proteins, vegetable proteins, and mixtures thereof. Proteins are generally incorporated in an amount ranging from 2–10 grams per 4 fluid ounce serving.

In addition to the nutrients described above, some natural—herbal sources of nutrients can be incorporated. For instance, Green tea catechins are associated with lowering blood cholesterol and are also known to be scavengers of free radicals and chelators of metals in the body, making them effective antioxidant nutrients. Cayenne helps restore proper functioning of the body. One of the key active ingredients in cayenne is capsaicin, which is responsible for invigorating the body, stimulating blood flow, promoting sleep and aiding in digestion. The fruit of the cayenne pepper also contains flavonoids, magnesium, phosphorous, sulfur, potassium, iron and calcium, and is high in vitamins A, B-complex and C. Ginger has antispasmodic properties and is useful for alleviating muscular and psychological tension, reducing inflammation, aiding in circulation, as well as having antiemetic and has analgesic properties. The ginger rhizome contains calcium, iron, magnesium, phosphorous, sodium, potassium and vitamins A, B-complex and C. Kava kava has antianxiety properties, as well as muscle relaxant and analgesic activity. St. John's Wort has antispasmodic, anti-depressant, anti-inflammatory and analgesic properties. St. John's Wort includes components such as flavonoids, carophyllene, hypericin and pseudohypericin. Eleutherococcus senticosus (Siberian Ginseng) is an adaptogenic herb known to improve mood, attention, energy and a sense of well being. It is also known to be immunostimulatory and useful to treat stress and fatigue. Panax Ginseng is known to stimulate the anterior pituitary to release ACTH in a non-stressed state thereby increasing overall alertness and well being. The combination of ginsengs and licorice root with its well known multiple actions including adrenocorticoid-like activity also supports adrenal function. Chickweed has anti-inflammatory, body invigorating and stimulating properties. Chickweed contains vitamin C, flavonoids, coumarins and triterpenoid saponins.

Additional information on herbal nutrients can be found in books such as the Encyclopedia of Medicinal Plants, Andrew Chevallier (1996); The Complete Family Guide to Natural Home Remedies, edited by Karen Sullivan (1997); and The Complete Family Guide to Homeopathy, by Christopher Hammond (1995).

The frozen dessert may include other optional ingredients typically present in conventional frozen desserts such as stabilizers e.g., stabilizing gums, water-binding gums, gelling agents, and insoluble blocking agents. Stabilizers produce a smoothness in the textural properties of the product, retard or reduce ice crystal growth during storage of the product, provide uniformity in the product and resistance to melting. Stabilizers typically function through their ability to form gel structures in the water or their ability to combine with the water by hydration. Stabilizers include but are not limited to sodium alginate, propylene glycol alginate, calcium sulphate, gelatin, gum acacia, guar gum, gum karaya, locust bean gum, gum tragacanth, carrageenan and salts thereof, xanthan gum, microcrystalline cellulose, cellulose ethers such as methyl cellulose, hydroxypropyl cellulose, hydroxypropylmethyl cellulose, carboxymethyl cellulose and its sodium salt, as well as mixtures of these stabilizers. Preferred stabilizers are carrageenan, xanthan gum, locust bean gum, guar gum, and mixtures thereof. Water-binding gums include, but are not limited to, locust bean gum, guar gum, propylene glycol alginate, tara gum, sodium carboxymethyl cellulose, and other cellulose ethers. Gelling agents include, but are not limited to, gelatin, xanthan gum, carrageenan, sodium alginate, and pectin. The amount of stabilizer included in the frozen dessert is typically in an amount of up to about 1% in a non fat product and about 0.1–0.5% for other ice cream mixes. In other embodiments the level of stabilizer may exceed 1% by weight.

Emulsifiers are added to improve the dispersal of fat, control agglomeration of fat globules after homogenization, aid in the inclusion of air during freezing, increase resistance to melting and impart dryness to the extruded product. Emulsifiers include, but are not limited to, mono- and diglycerides, distilled mono-glycerides and drying agents such as polysorbate 80, polysorbate 65, and ethoxylated mono- and diglyercides. Emulsifiers are generally present in an amount between 0.05% and 0.2% by weight of the total product. Lecithin is also known to be an effective emulsifier.

Lecithin is a phospholipid complex commercially extracted from soy beans and other plant sources. An embodiment of the invention exceeds 0.2 percent by weight of an emulsifier in order to provide supplemental levels of phosphatidylcholine. Egg yolk solids, another optional ingredient of the frozen dessert, provide large amounts of lecithin. Custard type ice creams and French Vanilla ice creams have a unique smoothness attributed to the presence of lecithin in the added egg yolk solids. Egg yolk solids may be obtained from, for example, liquid egg yolks, frozen egg yolks, dried egg yolks, liquid whole eggs, frozen whole eggs, sugared frozen egg yolks, salted frozen egg yolks, dried whole eggs, or combinations of the foregoing egg yolk substances.

Preservatives may also be added to extend product shelf life. Preservatives include, but are not limited to, potassium sorbate, sodium sorbate, potassium benzoate, sodium benzoate, and calcium disodium EDTA.

The frozen dessert product may be formulated by culturing the compositions of the present invention with a bacterial culture such as lactic acid-producing bacteria *Lactobacillus bulgaricus* and *Streptococcus thermophiltis* or by directly adding live cultures after pasteurization. Other examples of probiotic organisms include, but are not limited to, *Bifidobacterium* spp., *Lactobacillus acidophilus* and *Bifidobacterium bifidum*. As used herein, the term "probiotic" refers to a mono or mixed culture of live microorganisms, that when applied to man or animal, beneficially affects the host by improving the properties of the indigenous microflora, such as bifidobacterium. Probiotic microorganisms may also include bacteria that produce therapeutic yogurts. For example, *str.salivarius* ssp. *Thermophilus, Lb. Acidophilus, B. bifidium*, in therapeutic yogurts, survive transit through the stomach, remain active in the presence of bile, and have the ability to colonize the intestine. The frozen yogurt may also be formulated from organic milk that may contain microorganisms such as *S. Thermophilus, L. Bulgaricus, L. Acidophilus, Bifudus, L. Casei*, and *L. Reuteri*. As used herein, the term "prebiotic" refers to a non-digestive food that beneficially affect the host by selectively stimulating the growth and/or activity of one or a limited number of bacteria in the colon. The prebiotic, Fructooligosaccharides (FOS), promotes the proliferation of bifidobacteria and lactobacilli in the digestive tract. The levels of less desirable organisms such as clostridia, bacteriosides, and coliforms, appear to be reduced. Moreover, butryic acid, a short chain fatty acid (SCFA) is produced by the bifidobacteria fermentation of FOS. This SCFA is the main energy source for colonic epithelium.

Another embodiment of the present invention utilizes space for solids such as dietary fibers, which are uncharacteristic of ice cream. Insoluble fibers such as cellulose, lignin, hemicelluloses, insoluble pectins and enzyme resistant starches do not dissolve in water and help to increase intestinal transit times. Soluble fibers such as soluble gums (including b-glucan), soluble pectins, and other soluble polysaccharides can decrease cholesterol absorption; delay the absorption of glucose in the small intestine; and delay gastric emptying and increase the satiety value of food.

Once the components are mixed in the mixing tank, the mixture can be subjected to pasteurization and homogenization. When the pasteurizer is of the batch type, homogenization follows immediately afterwards. In a continuous flow system, homogenization may be required to occur prior to pasteurization. Homogenization generally occurs in a two stage homogenizer with a pressure of about 2500–3000 psi in the first stage and a pressure of about 500 psi in the second stage for ice creams with 8% fat or less. As the fat content increases the first stage pressure typically decreases, the second stage pressure usually remains around 500 psi. The homogenized mix is then pasteurized according to FDA thermal processing requirements. Pasteurization is a process in which the mix is heated to a temperature of approximately 175° F. to about 185° F. for 25 seconds to about 30 seconds in a high temperature-short time (HTST) system. Batch pasteurization heats the mix to a lower temperature, approximately 150° F., and a longer time, 30 minutes. Other systems such as higher-heat-short time (HHST) have a shorter processing time and higher processing temperature.

Viscosity of the ice cream mix may be a major determination in specifying pasteurization parameters. A mix may be so viscous as to cause the flow within the pasteurizer to be affected, less turbulent. This may require extending the tube length of the pasteurizer and/or decreasing the pumping rate or increasing the processing temperature. Also, because of the lack of turbulence within the heating tube, the quality of the mix nearest the wall of the holding tube may be compromised in quality due to the extended heat time. Hence a processor may incur increased processing costs, reduced plant capacity and possibly additional equipment. The invention allows, in effect, a formulator to add significantly more solids to an ice cream mix or ice cream like mix than previously thought possible. This is accomplished without adversely impacting manufacturing costs or capacity.

After pasteurization and homogenization, the mixture is cooled to about 40° F. or less and stored in a holding tank at that temperature for anywhere between several hours and a day.

After the storage, either part or all of the mixture is transferred to a flavor tank where flavoring is added. As used herein a flavoring agent refers to compounds which impart a flavors, referred to as flavorings, coloring agents, spices, nuts, candy, cookie crumbs, cookie dough, whole or comminuted food pieces, purees, extracts, concentrates and essences, and can be derived from natural and/or synthetically produced sources. Flavorings can be in the form of flavored extracts, volatile oils, chocolate flavorings, caramel flavorings, peanut butter flavoring, vanilla or any commercially available flavoring such as strawberry, raspberry, cherry, lemon-lime, cranberry and blueberry flavorings. Other examples of useful flavorings include but are not limited to pure anise extract, imitation banana extract, imitation cherry extract, chocolate extract, pure lemon extract, pure orange extract, pure peppermint extract, imitation pineapple extract, imitation rum extract, imitation strawberry extract, or pure vanilla extract; or volatile oils, such as balm oil, bay oil, bergamot oil, cedarwood oil, cherry oil, cinnamon oil, clove oil, or peppermint oil; peanut butter, chocolate flavoring, butterscotch or toffee.

The flavoring agents can be fruit or non-fruit flavoring agents and may be natural or synthetic. Examples of suitable natural flavorings include: (1) citrus and non-citrus fruit flavors (e.g., whole or comminuted fresh fruit, fruit purees, fruit concentrates, extracts or essences, candied or glazed fruits, and dried fruits); (2) sugar-free versions of such fruit flavorings; (3) flavors derived from botanicals; (4) spices; (5) chocolate, cocoa or chocolate liquor; (6) coffee; (7) natural flavorings obtained from vanilla beans; (8) nuts, including nutmeats and nut extracts from pecans, walnuts, almonds, pistachios, filberts, coconuts and peanuts. Other sources of natural flavorings include liqueur flavorings such as rum, whiskey and other distilled beverages, fruit brandy distillate and brandy flavor essence, and fruit liqueurs. Examples of non-natural or synthetically derived flavorings include aromatic chemicals and imitation flavors. The particular amount of flavoring substance included in the frozen dessert products of the present invention will depend upon the flavor effects desired and the particular flavoring substance used. Usually, the flavoring substance comprises from about 0.5% to about 20% of the product. In one embodiment a non-fruit flavoring ranges from about 0.5% to about 4% where the preferred embodiment being about 1% to about 1.5% by weight of the formula. In another embodiment, a fruit flavoring may range from about 5% to about 20% and more preferably from about 11% to about 16% by weight.

After addition of the flavoring agent, the material is frozen and transferred to containers. The freezing process may be accomplished using any type of standard ice cream freezer equipment. For instance, the mixture may be agitated and extruded at about 20 to 25° F. For example, the homogenized pasteurized mixture of the present invention can be partially frozen or solidified by using a batch freezer, continuous freezer, low temperature continuous freezer, a soft serve-type freezer, or a counter-type freezer. The particular temperature and time conditions for carrying out this partial freezing step can vary greatly depending upon the type of freezer used. For example, the homogenized pasteurized mixtures of the present invention can be partially frozen at temperatures in the typical range of from about 18° F. to about 23° F. over a period of from about 24 seconds (e.g., continuous or low temperature continuous freezer) to about 10 minutes (e.g., batch or counter freezer). During partial freezing, it is often desirable to agitate, aerate and/or whip the mixture to incorporate air to provide the desired amount of overrun and finished product texture. The particular amount of overrun obtained can be any level appropriate for conventional frozen dessert products, in particular ice cream products. However, the incorporation of air compromises the added nutritional value. Preferred embodiments of the invention utilize an overrun of approximately 35%. The resulting weight of a 4 fl oz serving is subsequently and approximately 96 grams.

The extruded material is preferably in a semi-solid state for incorporation into containers or depending upon the application into novelties such as bars, sandwiches or push-ups. Once in the container or particular novelty format, the frozen dessert may be held in a freezer, e.g., at about −30° F., for about 1 to 2 hours. The above are examples of homogenization, pasteurization, and freezing processes. These methods may be accomplished by any equivalent method for making ice cream known in the art.

The products produced according to the methods of the invention are useful for the general improvement of nutritional wellbeing as well as an aid in the treatment of specific disorders. For example, the frozen dessert of the present invention may support immune function, promote healthy intestinal flora, aid energy needs and/or support tissue repair. Additionally, the ice cream and frozen dessert products may simply be eaten as a snack by healthy individuals. As described in more detail in the example's section, it has been demonstrated that the products of the invention are useful for enhancing nutritional intake by those at risk of malnourishment such as the elderly. Likewise, the products may be useful for enhancing nutritional intake and meeting established dietary requirements, may stimulate the immune system, may be suitable for both insulin and non-insulin dependent diabetics, may enhance anti-oxidant status and a variety of other physiological benefits.

Many methods are known in the art for determining the palatability of a food product. Some of these methods assess flavor and others assess odor. One method is referred to as the average organoleptic taste and/or odor detection threshold evaluation method. As used herein, the "average organoleptic taste and/or odor detection threshold evaluation" is a measure for assessing the relative taste and/or odor or consistency of a frozen dessert product. The relative amount of taste and/or odor of a food product is quantified as a threshold required for an average group of persons to taste and/or smell an unpalatable or unpleasant flavor or odor as compared to the level or amount of a control. In the case of a frozen dessert of the invention, the suitable controls are non-fortified ice cream (palatable taste) or fortified ice cream prepared by methods other than the methods of the invention (unpalatable taste).

Briefly, various samples of a frozen dessert product i.e., a the control frozen dessert or the frozen dessert of the invention are arranged for testing by groups of individuals. Prior to each testing, the sample is isolated from the other samples. The subject to be tested is then given a series of control dessert samples (of predetermined increasing or decreasing palatability) and asked to taste and smell the sample. The subject then rates the sample on a relative scale (i.e., 1 to 10) for palatability. The order of testing is randomized between subjects. All testing is conducted by a single tester. A threshold concentration at which a subject first detects a palatable or unpalatable taste is established for each subject. This threshold value can then be used to analyze the values obtained for the same type of test performed for the test frozen dessert compositions of the invention.

The above-described assay is provided for exemplary purposes only. Any assay ordinarily used in the art may be sufficient to determine whether a frozen dessert is palatable compared to controls. Other assays for measuring and comparing the odor and taste of different compounds are disclosed in U.S. Pat. Nos. 4,381,402; 4,180,589; 5,482,855; and 5,571,519.

The present invention is further illustrated by the following Examples, which in no way should be construed as further limiting.

EXAMPLE I

| Vanilla Milk—3.5% | 66.65 |
|---|---|
| Fructose | 11.12 |
| Supplemental Oils | 4.41 |
| Whey Concentrate | 4.32 |
| Sucrose | 3.21 |
| Micronutrients | 2.38 |
| Rice Syrup—26DE | 2.14 |
| Non Fat Dry Milk | 1.84 |
| Vanilla Flavor | 1.39 |
| Guar Gum | 0.68 |
| Prebiotic | 0.58 |
| Cellulose | 0.51 |
| Stabilizer and Emulsifier | 0.44 |
| Citric Acid | 0.28 |
| Probiotic | 0.04 |
| | 100.00 |

Method: Mix Making
 1) Liquefy milk and sugars together
 2) Add oils and continue liquefy
 3) Add whey protein, emulsifier, milk powder, stabilizers, guar gum and cellulose
 4) Add pre-blended mix of micronutrients and citric acid and complete liquefying 5) HTST pasteurization of 185° F. for 30 seconds—Homogenize at 1500/500 psi
6) Hold for minimum of 4 hours before flavoring and freezing
7) pH target 7.1; Range 7.0–7.2

Flavoring the Mix:
Add: 98.57% mix
Add: 1.39 vanilla flavor
Add: 0.04% probiotic
100.00%
Freezing: Freeze to 19° F.–20° F. (or 6.7° C.)
Overrun is 35%
Storage: 10° F.–20° F. Below Zero (−25° C. to −30° C.)

EXAMPLE II

| Chocolate Mint (Soy based) Frozen Dessert: | |
| --- | --- |
| Soy Milk Concentrate | 43.40 |
| Water | 25.60 |
| Fructose | 11.93 |
| Supplemental Oils | 4.98 |
| Sucrose | 3.83 |
| Rice Syrup | 2.55 |
| Cocoa | 2.39 |
| Micronutrients | 2.34 |
| Guar Gum | 0.85 |
| Natural Flavors | 0.81 |
| Prebiotic | 0.56 |
| Stabilizers and Emulsifier | 0.46 |
| Citric Acid | 0.32 |
| | 100 |

Method: Mix Making
1) Liquefy soy milk and sugars together
2) Add oils and continue to liquefy
3) Add cocoa, stabilizers, emulsifier and guar gum
4) Add pre-blended mix of micronutrients and citric acid and complete liquefying
   (a) Alternatively mix the citric acid (dry) with a portion of the sugars. Add micronutrients and citric acid sugar combination in close proximity to each other or by alternating adding a portion of the micronutrients followed by the citric acid and sugar mix.
5) HTST pasteurization at 185° F. for 30 seconds.
6) Homogenize at 1500/500 psi
7) Hold for a minimum of 4 hours before flavoring and freezing
8) pH target 6.9; Range 6.8–7.0

Flavoring the Mix: Percentages Based on Weight
99.19% Soy mix
0.81% Flavors
100.00% Total
Freezing: Freeze to 19° F.–20° F.
Overrun is 35%
Storage: 10° F.–20° F. below zero (−25° C. to −30° C.)

EXAMPLE III

| Lemon-Lime Frozen Dessert: | |
| --- | --- |
| Lemon-Lime Concentrate | 3.02 |
| Water | 64.03 |

-continued

| Lemon-Lime Frozen Dessert: | |
| --- | --- |
| Whey Concentrate | 8.27 |
| Maltodextrin | 8.27 |
| Fructose | 6.62 |
| Sucrose | 5.79 |
| Micronutrients | 1.80 |
| Supplemental Oils | 1.49 |
| Stabilizer | 0.30 |
| Malic Acid | 0.21 |
| Natural Flavors | 0.20 |
| | 100.00 |

Method: Mix Making
1) Add fruit concentrate, water and sugars and liquefy
2) Add oils and continue to liquefy
3) Add whey protein and stabilizer and continue to blend
4) Add micronutrients and malic acid in close proximity or pre-blend these ingredients prior to adding mix
5) HTST pasteurization at 185° F. for 30 seconds
6) Hold for a minimum of 4 hours before flavoring and freezing
7) Homogenize at 1500/500 psi
8) pH target range 4.5–5.5

Flavoring the Mix by Weight
98.80% Lemon-Lime Mix
0.20% Natural Flavors
100.00
Freezing: Freeze to slurry of 23° F. (−5° C.)
Fill 4 fl oz mold to desired weight—130 g
Freeze in brine solution to −40° C.
Overrun is 30%
Storage: 10° F.–20° F. below zero (−25° C. to −30° C.)

EXAMPLE IV

| Chocolate-Mint (Soy-Whey Base): | |
| --- | --- |
| Water | 60.13 |
| Soy Milk Powder | 8.61 |
| Fructose | 12.06 |
| Supplemental Oils | 4.95 |
| Sucrose | 3.87 |
| Cocoa | 2.41 |
| Micronutrients | 2.37 |
| Rice Syrup | 2.15 |
| Whey Concentrate—No Lactose | 1.29 |
| Natural Flavors | 0.80 |
| Prebiotic | 0.56 |
| Stabilizer and Emulsifier | 0.45 |
| Citric Acid | 0.34 |
| | 100 |

Method: Mix Making
1) Liquefy water and sugars together
2) Add oils and continue to liquefy
3) Add soy powder, cocoa, stabilizers, emulsifier, and guar gum
4) Add pre-blended mix of micronutrients and citric acid and complete liquefy
   a) Alternatively mix the citric acid (dry) with a portion of the sugars. Add micronutrients and citric acid sugar combination in close proximity to each other or by alternating adding a portion of the micronutrients followed by the citric-acid and sugar mix.
5) HTST pasteurization at 185° F. for 30 seconds
6) Homogenize at 1500/500 psi
7) Hold for a minimum of 4 hours before flavoring and freezing
8) pH target 6.9; Range 6.8–7.0

Flavoring the Mix: Percentages Based on Weight
99.2%—Soy Mix
0.8% Flavors
100.00% Total Freezing: Freeze to 19° F.–20° F.
Overrun is 35%

Storage: 10° F.–20° F. below zero (–25° C. to –30° C.)

EXAMPLE V

EXAMPLE V

| Hi Protein Chocolate (Dairy) | |
| --- | --- |
| Milk—3.4% | 65.49 |
| Fructose | 11.69 |
| Whey Concentrate | 6.10 |
| Supplemental Oils | 4.41 |
| Sucrose | 3.68 |
| Micronutrients | 2.36 |
| Cocoa | 2.16 |
| Rice Syrup | 1.30 |
| Non Fat Dry Milk | 1.08 |
| Prebiotic | 0.58 |
| Citric Acid | 0.45 |
| Stabilizer and Emulsifier | 0.44 |
| Natural Flavors | 0.22 |
| Probiotic | 0.04 |
| | 100 |

Method: Mix Making
1) Liquefy milk and sugars together
2) Add oils and continue to liquefy
3) Add whey protein, cocoa, emulsifier, milk powder and stabilizer,
4) Add pre-blended mix of micronutrients and citric acid and complete liquefying
5) HTST pasteurization at 185° F. for 30 seconds— Homogenize at 1500/500 psi
6) Hold for minimum of 4 hours before flavoring and freezing
7) pH target 7.1; Range 7.0–7.2

Flavoring the Mix: Percentages by Weight
99.74% Mix
0.22% Flavor
0.04% Probiotic
100.00%

Freezing: Freeze to 19° F.–20° F. (or 6.7C)
Overrun is 35%

Storage: 10° F.–20° F. Below Zero (–25° C. to –30° C.)

EXAMPLE VI

| Lemon—Lime Frozen Dessert: | Percent by Weight |
| --- | --- |
| Lemon-Lime Concentrate | 3.4 |
| Water | 69.9 |
| Whey Concentrate | 8.3 |
| Maltodextrin | 7.5 |
| Fructose | 3.7 |

| Lemon—Lime Frozen Dessert: | Percent by Weight |
| --- | --- |
| Sucrose | 3.5 |
| Micronutrients | 1.7 |
| Supplemental Oils | 1.5 |
| Stabilizer | 0.3 |
| Malic Acid | 0.2 |
| Stevia | 0.04 |
| | 100.00 |

Flavoring the Mix: Percentages by Weight
99.0% Lemon-Lime Mix
1.0% Natural Flavors Method: Mix Making
1) Add fruit concentrate, water and sweeteners and liquefy
2) Add oils and continue to liquefy
3) Add whey protein and stabilizer and continue to blend
4) Add micronutrients and malic acid in close proximity or pre-blend these
   ingredients prior to adding mix
5) HTST pasteurization at 185° F. for 30 seconds
6) Hold for a minimum of 4 hours before flavoring and freezing
7) Homogenize at 1500/500 psi
8) pH target range 4.5–5.5

Flavoring the Mix: Percentages by Weight
99.0% Lemon-Lime Mix
1.0% Natural Flavors
100%

Freezing: Freeze to slurry of 23° F. (–5° C.)
Fill 4 fl oz mold to desired weight—130 g
Freeze in brine solution to –40° C.
Overrun is 30%

Storage: 10° F.–20° F. below zero (–25° C. to –30° C.)

Market Test

A 90 day market test was conducted in several long term care and acute care facilities and a children's day program that included more than 300 individuals. The primary purpose of the test was to determine the acceptance level of a nutrient dense meal supplemental ice cream formulated and manufactured according to the invention. The employees of each healthcare facility tracked the acceptance. In all cases, product acceptance was measured by a rigorous standard that required 100% of a four fluid ounce serving to be consumed, to be tabulated as "accepted" by the consumer. The products tested were both dairy and non dairy embodiments of the invention, a total of five flavors. Acceptance of each flavor exceeded 80% and in some cases, such as vanilla, approached 90%.

Clinical Study

A pilot trial was conducted to evaluate the taste, acceptability, tolerance, and efficacy of the nutritional frozen dessert of the present invention in facilitating weight maintenance and gain in an at risk elderly population. An at risk elderly population is defined as individuals at nutritional risk for involuntary weight loss. Involuntary or unintentional weight loss is defined as a weight loss of >5% of body weight in the past month, >7.5% in the last 60 days, or >10% in the last 90 days. Individuals whose body mass index (BMI) is <24 [weight kg/height m$^2$] are at increased risk of developing pressure ulcers, increased risk of morbidity, mortality and functional decline.

Twenty three subjects between the ages of 76 and 94 (average age 85 years) were chosen from the residents of a skilled nursing and rehabilitation facility. The subject population included six males and seventeen females, ten of whom had been diagnosed with dementia and four of whom had diabetes. Individuals were included if they had experienced a weight loss of at least 5% of body weight in the past month and/or were below ideal body weight at the time of enrollment in the study. All subjects were considered to be nutritionally at risk for further weight loss and had been prescribed additional nourishments, prior to enrollment in the study. No laboratory data was consistently available to correlate depleted protein stores.

Four flavors of the nutritious frozen dessert of the present inventions were offered as dairy based choices. There was one non-dairy soy based choice. The dairy choices provided a typical micro and macro-nutrient profile per serving as detailed in Table 4.

TABLE 4

% of Daily Values based on a 2000 Calorie Diet
Per 4 fl oz—118 ml serving

|  |  |  | % DV |
|---|---|---|---|
| Calories | 170 |  |  |
| Total Fat (g) | 7 |  | 11 |
| Saturated Fat (g) | 4 |  | 19 |
| Total Carbohydrates (g) | 22 |  | 7 |
| Dietary Fiber (g) | 2 |  | 8 |
| Sugars (g) | 16 |  |  |
| Protein (g) | 6 |  | 12 |

|  | %DV |  |  |
|---|---|---|---|
| Vitamin A | 33 | Calcium | 40 |
| Vitamin D | 40 | Phosphorus | 25 |
| Vitamin E | 100 | Magnesium | 33 |
| Vitamin K | 25 | Iron | 25 |
| Vitamin C | 100 | Iodine | 25 |
| Thiamin | 25 | Zinc | 33 |
| Riboflavin | 25 | Copper | 33 |
| Niacin | 25 | Manganese | 33 |
| Vitamin B6 | 50 | Chromium | 33 |
| Vitamin B12 | 50 | Selenium | 50 |
| Biotin | 25 | Molybdenum | 33 |
| Folic Acid | 50 | Pantothenic Acid | 33 |

Subjects were offered the nutritional frozen dessert three times a day. A frozen single-serve cup (4 fl oz) was placed on both the lunch and dinner trays and a third serving was offered by licensed nurse assistants (LNA) at the afternoon nourishment pass. LNAs maintained food intake records and meals/snacks were recorded by percent consumed. A registered dietitian calculated the calories offered and actually consumed on a weekly basis by averaging the daily intake from the food records. The general and therapeutic diets offered in this study were calculated to provide 2000 calories with 75 grams of protein (15% of total calories) per day.

Weights of subjects were obtained and recorded weekly by a specially trained LNA who had completed all the weigh-ins in the facility for the past five years. An ARJO tub cart scale model number 202–200 (available from ARJO of Roselle, Ill.) was used to obtain weights. All weights were consistently assessed in the afternoon. Analysis of the offered diets were completed at baseline, throughout the study period and for a three month follow-up period. The caloric and dietary protein values of diets offered to subjects were consistent during this time period.

Of the twenty-three subjects initially selected, fourteen completed the study. The remaining nine subjects did not complete the study for a variety of reasons: five were lost due to death (unrelated to the study); three were discharged from the facility and one had an enteral feeding (PEG) tube placed. The fourteen subjects who completed the study were three men and eleven women. The mean age of the subjects was 85±5.6; mean height was 64 (in)±3.1; mean weight was 130.8 (lb)±28.9; and the mean BMI was 22.2±3.4. The study ran for 12 weeks from February 2001 through April, 2001. The subjects averaged 11 weeks of consuming the nutritional frozen dessert with a range of 9 to 12 weeks.

Eighty-six percent of subjects (12 individuals) were able to maintain or gain weight during the study period. Anthropometric data during the three months prior to starting the study showed that weight changes were not significant in this group of subjects ($p>0.4$). Data during the 9 to 12 weeks of consuming the frozen dessert showed 6 subjects experienced a weight gain, (defined as >2 pounds gain), six subjects maintained their weight (defined as less than or equal to 2 pounds gain or loss) and two subjects experienced weight loss (defined as >2 pounds loss). The weight gain range in the six subjects who gained weight was 4 to 13 pounds with a mean of 6 pounds, and in the two who lost weight, the range of weight loss was 5 to 7 pounds with a mean of 6 pounds. Data collected after the nutritional frozen dessert was no longer provided showed that subjects lost a significant amount of weight during the next three months ($p=0.044$) despite being offered other nourishments of equivalent caloric value. After the trial during May through June 2001, there was a mean weight loss of 3.93 pounds, compared to a mean weight gain of 1.64 pounds from baseline through week 9 of the trial during the months of February through April 2001. The difference ($p=0.032$) in mean weight change after the trial was significant.

The nutritional frozen dessert contributed between 453 to 525 calories per day to the subjects' total caloric intake. Dietary analysis of actual foods and nourishments consumed during the study period determined that the average daily caloric intake for subjects who gained weight was 1859 calories per day with the frozen desserts supplying 28% of the total daily caloric intake. The caloric intake of subjects who maintained weight was 1737 calories per day with 26% of these calories supplied by the frozen dessert and of subjects who lost weight was 1228 calories with 37% of these calories supplied by the frozen dessert.

During the trial, the four subjects with diabetes had no change in blood sugar control during the trial as detailed in Table 5.

TABLE 5

Diabetic Subjects—Values Determined by Finger Sticks (FS)

| Subject | Diabetic Type | Pre-Study FS Values Jan. 2001 | FS Values during Trial | | |
|---|---|---|---|---|---|
| | | | Feb. 2001 | Mar. 2001 | Apr. 2001 |
| Subject 1 | NIDMM[a] | 94 | NA[b] | 70–102 | 90–110 |
| Subject 2 | IDDM[c] | 156–180 | 147–169 | 150–178 | 142–169 |
| Subject 3 | IDDM | 80–169 | 75–142 | 83–181 | 84–172 |
| Subject 4 | NIDMM | 102–140 | 100–132 | 116–146 | 83–126 |

[a]Non-Insulin Dependent Diabetes
[b]Not Available. Physician had discontinued FS as values were in normal range. FS restarted in March.
[c]Insulin Dependent Diabetes Subjects accepted the nutritional frozen dessert with meals (lunch and dinner) 100% of the time but only 59% of the time as a between meal nourishment. Acceptance is defined to mean that a subject consumed the entire 4 fl oz serving. If a portion was left and discarded or if the subject was sleeping or out of the facility when the nutritional frozen dessert was offered, it was recorded that the subject did not accept the nourishment. The acceptance rate of the nutritional frozen dessert is significant when compared to the acceptance rate of other offered items such as double strength milk based beverages, fortified puddings, soups, cereals, enriched potatoes, or gelatins as well as a variety of commercially available supplements. In-house documentation and meal monitoring has found the acceptance rate of these items generally offered in combination with one another range from 25 to 60 percent, where most residents tire easily of supplements, either due to taste monotony, dissatisfaction with texture or disinterest in eating and/or drinking.

The results demonstrate that at risk individuals who are consistently unable to meet their macronutrient and caloric requirements may benefit from the nutritional frozen dessert, and the dessert may be appropriate for individuals with diabetes. As noted above, skilled nursing and long-term care facilities face the challenge of providing sufficient, palatable nourishment to residents with poor appetites who are at nutritional risk for involuntary weight loss where unintentional weight loss is identified in 50% to 65% of nursing home residents increasing the risk of functional decline. National statistics demonstrate that up to 23% of residents in skilled nursing facilities develop a pressure ulcer, the cost of treatment of which is extensive involving significant labor-time, medications and additional nourishment delivery to the resident, not to mention the associated pain and discomfort to the resident.

Other individuals may also benefit from receiving the nutritional frozen dessert of the present invention. Such individuals may include, but are not limited to, individuals diagnosed with a medical condition, individuals preparing for or recovering from surgery or other medical treatments, athletes, and children. For example, the subject, may have a condition selected from the group consisting of osteoporosis, eczema, pregnancy, menopause, and fibriocystic breast disease. The subject may be diabetic or an immune deficient subject. In one embodiment, the subject may have rheumatoid arthritis and the frozen dessert product may be fortified with gamma linolenic acid (GLA).

The foregoing written specification is considered to be sufficient to enable one skilled in the art to practice the invention. The present invention is not to be limited in scope by examples provided, since the examples are intended as a single illustration of one aspect of the invention and other functionally equivalent embodiments are within the scope of the invention. Various modifications of the invention in addition to those shown and described herein will become apparent to those skilled in the art from the foregoing description and fall within the scope of the appended claims. The advantages and objects of the invention are not necessarily encompassed by each embodiment of the invention.

All references, patents and patent publications that are recited in this application are incorporated in their entirety herein by reference.

We claim:

1. A nutritious frozen dessert comprising:
   a base component,
   a nutrient core of at least 1% by weight of the dessert product, wherein the nutrient core includes at least one micronutrient selected from the group consisting of: Folate, Magnesium, Phosphorus, Zinc, Selenium, iron, copper, chromium, molybdenum, manganese, iodine, potassium, sodium, Vitamin A, Vitamin C, Vitamin D, Vitamin B1, Vitamin B2, Vitamin B3, Vitamin B5, Vitamin B6, Vitamin B12, Vitamin E, Vitamin K, biotin, choline, chloride, vanadium, boron and combinations thereof; and
   a sweetener including greater than 25% by weight of the total sugar added of a high Freezing Point Depression Sweetener.

2. The frozen dessert of claim 1, wherein the dessert includes per serving size:
   from about 0.1% to about 100% of the daily value of an ingredient selected from the group consisting of: Folate, Calcium, Magnesium, Phosphorus, Zinc, Vitamin A, Vitamin D, Vitamin B1; Vitamin B2, Vitamin B3, Calcium Pantothenate; and combinations thereof;
   from about 0.1% to about 200% of the daily value of an ingredient selected from the group consisting of: Vitamin B6, Vitamin B12, Vitamin E, and combinations thereof; and
   from about 0.1% to about 250% of the daily value of Vitamin C;
   wherein the percent daily value is based on a 2,000 calorie diet.

3. The frozen dessert of claim 1, including:
   from about 0.1% to about 80% of the daily value of Folate;
   from about 0.1% to about 80% of the daily value of Calcium;
   from about 0.1% to about 80% of the daily value of Magnesium;
   from about 0.1% to about 80% of the daily value of Phosphorus;
   from about 0.1% to about 80% of the daily value of Zinc;
   from about 0.1% to about 80% of the daily value of Vitamin A;
   from about 0.1% to about 250% of the daily value of Vitamin C;
   from about 0.1% to about 80% of the daily value of Vitamin D;
   from about 0.1% to about 100% of the daily value of Vitamin B1;
   from about 0.1% to about 100% of the daily value of Vitamin B2;
   from about 0.1% to about 100% of the daily value of Vitamin B3;
   from about 0.1% to about 200% of the daily value of Vitamin B6;
   from about 0.1% to about 200% of the daily value of Vitamin B12; and
   from about 0.1% to about 200% of the daily value of Vitamin E;
   wherein the percent daily value is based on a 2,000 calorie diet.

4. The frozen dessert of claim 3, including per serving size:
   from about 5% to about 50% of the daily value of Folate;
   from about 5% to about 50% of the daily value of Calcium;
   from about 5% to about 50% of the daily value of Magnesium;
   from about 5% to about 50% of the daily value of Phosphorus;
   from about 5% to about 50% of the daily value of Zinc;

from about 5% to about 50% of the daily value of Vitamin A;
from about 5% to about 100% of the daily value of Vitamin C;
from about 5% to about 50% of the daily value of Vitamin D;
from about 5% to about 50% of the daily value of Vitamin B1; and
from about 5% to about 100% of the daily value of Vitamin E;
wherein the percent daily value is based on a 2,000 calorie diet.

5. The nutritious frozen dessert of claim 4, including per serving size:
about 50% of the daily value of Folate;
about 40% of the daily value of Calcium;
about 33% of the daily value of Magnesium;
about 25% of the daily value of Phosphorus;
about 33% of the daily value of Zinc;
about 33% of the daily value of Vitamin A;
about 100% of the daily value of Vitamin C;
about 40% of the daily value of Vitamin D;
about 25% of the daily value of Vitamin B1; and
about 100% of the daily value of Vitamin E;
wherein the percent daily value is based on a 2,000 calorie diet.

6. The frozen dessert of claim 1, wherein the frozen dessert further comprises a base selected from the group consisting of: dairy, soy, rice, oat, almond, sesame, sunflower, lupine, taro, and combinations thereof.

7. The frozen dessert of claim 6, wherein the dairy base is milk or cream.

8. The frozen dessert of claim 1, wherein the nutrient core is a micronutrient core.

9. The frozen dessert of claim 1, further comprising an acidulant.

10. The frozen dessert of claim 8, wherein the acidulant is present in a range of about 0.1 weight percent to about 1.1 weight percent.

11. The frozen dessert of claim 1, wherein the high Freezing Point Depression Sweetener is selected from the group consisting of: dextrose, crystalline fructose, high fructose corn syrup 90%, high fructose corn syrup 55%, and high fructose corn syrup 42%, and combinations thereof.

12. The frozen dessert of claim 11, wherein the crystalline fructose is present in a range of about 3% to about 7%.

13. The frozen dessert of claim 11, wherein the crystalline fructose is present in a range of about 11 weight percent to about 17 weight percent.

14. The frozen dessert of claim 1, wherein the high Freezing Point Depression Sweetener is crystalline fructose.

15. The frozen dessert of claim 14, wherein the crystalline fructose is present in a range of about 3 weight percent to about 17 weight percent.

16. The frozen dessert of claim 1, further comprising a non-fruit flavoring agent.

17. The frozen dessert of claim 16, wherein the non-fruit flavoring agent is selected from the group consisting of: coffee, chocolate, chocolate mint, vanilla, mocha, caramel, maple, green tea, hazel nut, ginger, coconut, pistachio, rose, rum raisin, and combinations thereof.

18. The frozen dessert of claim 1, further comprising a fruit flavoring agent.

19. The frozen dessert of claim 18, wherein the fruit flavoring agent is selected from the group consisting of: mandarin, orange, strawberry, banana, raspberry, mango, passion fruit, peach, and combinations thereof.

20. The frozen dessert of claim 1, wherein the frozen dessert is fortified with a protein.

21. The frozen dessert of claim 20, wherein the frozen dessert further comprises calcium.

22. The frozen dessert of claim 21, wherein the frozen dessert includes per serving size:
about 6 g of protein;
about 40% of the daily value of vitamin D;
about 25% of the daily value of vitamin K;
about 100% of the daily value of vitamin E;
about 25% of the daily value of vitamin B1;
about 25% of the daily value of vitamin B2;
about 25% of the daily value of vitamin B3;
about 50% of the daily value of vitamin B6;
about 40% of the daily value of calcium;
about 33% of the daily value of magnesium;
about 33% of the daily value of zinc;
about 33% of the daily value of copper;
about 50% of the daily value of selenium.

23. The frozen dessert of claim 1, further comprising a macronutrient selected from the group consisting of a fat, a protein, a dietary fiber, and combinations thereof.

24. The frozen dessert of claim 1, wherein the sweetener includes greater than about 45% by weight of the total sugar added of a high Freezing Point Depression Sweetener.

25. The frozen dessert of claim 1, wherein sweetener includes greater than about 75% by weight of the total sugar added of a high Freezing Point Depression Sweetener.

26. The frozen dessert of claim 1, wherein the sweetener is 100% by weight of the total sugar added of a high Freezing Point Depression Sweetener.

27. The frozen dessert of claim 1, wherein the dessert has a relative sweetness of about 20% to about 30%.

28. The frozen dessert of claim 1, wherein the dessert has a relative level of sweetness of about 23% to about 27%.

29. The frozen dessert of claim 1, wherein the dessert has a relative level of sweetness of about 20% to about 23%.

30. The frozen dessert of claim 1, wherein the dessert has a relative sweetness of about 27% to about 30%.

31. The method of claim 30, wherein the high Freezing Point Depression Sweetener is selected from the group consisting of: dextrose, crystalline fructose, high fructose corn syrup 90%, high fructose corn syrup 55%, and high fructose corn syrup 42% and combinations thereof.

32. The method of claim 31, wherein the high Freezing Point Depression Sweetener provided is crystalline fructose.

33. A method of making a nutritious frozen dessert comprising:
mixing a base component and a nutrient core including at least one micronutrient selected from the group consisting of: Folate, Magnesium, Phosphorus, Zinc, Selenium, iron, copper, chromium, molybdenum, iodine, potassium, sodium, Vitamin A, Vitamin C, Vitamin D, Vitamin B1, Vitamin B2, Vitamin B3, Vitamin B5, Vitamin B6, Vitamin B 12, Vitamin K, Vitamin E, biotin, choline, chloride, vanadium, boron, and combinations thereof to produce a mixture, wherein the percent daily value is based on a 2000 calorie diet;
adding a sweetener including greater than 25% by weight of the total sugar added of a high Freezing Point Depression Sweetener;
pasteurizing and homogenizing the mixture, and
freezing the pasteurized mixture to produce the nutritious frozen dessert.

34. The method of claim 33, wherein the nutrient core includes at least 100% of the daily value of Vitamin E.

35. The method of claim 33, wherein the nutrient core includes per serving size:
from about 0.1% to about 100% of the daily value of Folate;
from about 0.1% to about 80% of the daily value of Calcium;
from about 0.1% to about 80% of the daily value of Magnesium;
from about 0.1% to about 80% of the daily value of Phosphorus;
from about 0.1% to about 80% of the daily value of Zinc;
from about 0.1% to about 80% of the daily value of Vitamin A;
from about 0.1% to about 250% of the daily value of Vitamin C;
from about 0.1% to about 80% of the daily value of Vitamin D;
from about 0.1% to about 100% of the daily value of Vitamin B1;
from about 0.1% to about 100% of the daily value of Vitamin B2;
from about 0.1% to about 100% of the daily value of Vitamin B3;
from about 0.1% to about 200% of the daily value of Vitamin B6;
from about 0.1% to about 200% of the daily value of Vitamin B12.

36. The method of claim 35, wherein the nutrient core includes per serving size:
about 50% of the daily value of Folate;
about 40% of the daily value of Calcium;
about 33% of the daily value of Magnesium;
about 25% of the daily value of Phosphorus;
about 33% of the daily value of Zinc;
about 33% of the daily value of Vitamin A;
about 100% of the daily value of Vitamin C;
about 40% of the daily value of Vitamin D; and
about 25% of the daily value of Vitamin B1.

37. The method of clam 33, wherein the nutrient core includes per serving size:
from about 5% to about 50% of the daily value of Folate;
from about 5% to about 50% of the daily value of Calcium;
from about 5% to about 50% of the daily value of Magnesium;
from about 5% to about 50% of the daily value of Phosphorus;
from about 5% to about 50% of the daily value of Zinc;
from about 5% to about 50% of the daily value of Vitamin A;
from about 5% to about 100% of the daily value of Vitamin C;
from about 5% to about 50% of the daily value of Vitamin D;
from about 5% to about 50% of the daily value of Vitamin B1.

38. The method of claim 33, wherein the base component provided is selected from the group consisting of: dairy, soy, rice, oat, almond, sesame, sunflower, lupine, taro, and combinations thereof.

39. The method of claim 38, wherein the dairy base is milk or cream.

40. The method of claim 33, further comprising adding an acidulant prior to pasteurization.

41. The method of claim 40, wherein the acidulant is added in a range of about 0.1 weight percent to about 0.6 weight percent.

42. The method of claim 33, wherein the crystalline fructose is added in a range of about 3.0 weight percent to about 17.0 weight percent.

43. The method of claim 42, wherein the crystalline fructose is present in a range of about 11 weight percent to about 17 weight percent.

44. The method of claim 42, wherein the crystalline fructose is present in a range of about 3% to about 7%.

45. The method of claim 33, further comprising adding a non-fruit flavoring prior to freezing the pasteurized mixture.

46. The method of claim 45, wherein the non-fruit flavoring agent is selected from the group consisting of: coffee, chocolate, chocolate mint, vanilla, mocha, green tea, hazel nut, ginger, coconut, pistachio, rose, rum raisin and combinations thereof.

47. The method of claim 33, further comprising adding a fruit flavoring agent prior to freezing the pasteurized mixture.

48. The frozen dessert of claim 47, wherein the fruit flavoring agent is selected from the group consisting of: mandarin, orange, strawberry, banana, raspberry, mango, passion fruit, peach, and combinations thereof.

49. The method of claim 33, further comprising adding a macronutrient selected from the group consisting of a protein, a fat, a dietary fiber; and combinations thereof.

50. The method of claim 33, wherein the dessert includes at least 1% of nutrient core.

51. The method of claim 33, wherein the dessert includes at least 2% of nutrient core.

52. The method of claim 33, wherein the nutrient core is a micronutrient core.

53. A nutritious frozen dessert comprising per serving size:
a base component,
from about 0.1% to about 100% of the daily value of an ingredient selected from the group consisting of: Folate, Calcium, Magnesium, Phosphorus, Zinc, Vitamin A, Vitamin D, Vitamin B1; Vitamin B2, Vitamin B3, Calcium Pantothenate; and combinations thereof;
from about 0.1% to about 200% of the daily value of an ingredient selected from the group consisting of: Vitamin B6, Vitamin B12, and combinations thereof;
from about 0.1% to about 250% of the daily value of Vitamin C;
at least about 100% of the daily value of Vitamin E; and
a sweetener including greater than 25% by weight of the total sugar added of a high Freezing Point Depression Sweetener,
wherein the percent daily value is based on a 2,000 calorie diet.

54. The frozen dessert of claim 53, wherein the sweetener is about 45% by weight of the total sugar added of a high Freezing Point Depression Sweetener.

55. The frozen dessert of claim 53, wherein the sweetener is about 75% by weight of the total sugar added of a high Freezing Point Depression Sweetener.

56. The frozen dessert of claim 53, wherein the sweetener is about 100% by weight of the total sugar added of a high Freezing Point Depression Sweetener.

57. A nutritious frozen dessert comprising:
a base component, wherein the base component includes at least one high fat dairy ingredient,
a nutrient core of at least 1% by weight of the dessert product, wherein the nutrient core includes at least one micronutrient selected from the group consisting of: Folate, Magnesium, Phosphorus, Zinc, Selenium, iron, copper, chromium, molybdenum, manganese, iodine, potassium, sodium, Vitamin A, Vitamin C, Vitamin D, Vitamin B1, Vitamin B2, Vitamin B3, Vitamin B5, Vitamin B6, Vitamin B12, Vitamin E, biotin, and combinations thereof; and a sweetener including greater than 25% by weight of the total sugar added of a high Freezing Point Depression Sweetener.

58. The frozen dessert of claim 57, wherein the sweetener includes greater than about 45% by weight of the total sugar added of a high Freezing Point Depression Sweetener.

59. The frozen dessert of claim 57, wherein the sweetener includes greater than about 75% by weight of the total sugar added of a high Freezing Point Depression Sweetener.

60. The frozen dessert of claim 57, wherein the sweetener is about 100% of a high Freezing Point Depression Sweetener.

* * * * *